United States Patent
Varma et al.

(10) Patent No.: US 9,178,683 B2
(45) Date of Patent: Nov. 3, 2015

(54) METHOD AND APPARATUS FOR PARALLEL DEMODULATION OF HIGH SYMBOL RATE DATA STREAMS IN A COMMUNICATIONS SYSTEM

(75) Inventors: Krishnaraj Varma, San Jose, CA (US); Tony Huang, Germantown, MD (US); Xiaoming Wu, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 13/478,744

(22) Filed: May 23, 2012

(65) Prior Publication Data

US 2013/0315346 A1 Nov. 28, 2013

(51) Int. Cl.
*H04L 7/00* (2006.01)
*H04L 7/033* (2006.01)
*H04L 27/26* (2006.01)

(52) U.S. Cl.
CPC ............ *H04L 7/0008* (2013.01); *H04L 7/0337* (2013.01); *H04L 27/2647* (2013.01)

(58) Field of Classification Search
CPC . H04L 7/0008; H04L 7/0337; H04L 27/2647; H04L 25/03038
USPC .................. 375/232, 316, 332, 345
See application file for complete search history.

(56) References Cited

U.S. PATENT DOCUMENTS

| | | | |
|---|---|---|---|
| 5,870,443 A * | 2/1999 | Rahnema | 375/355 |
| 6,904,273 B2 | 6/2005 | Steber et al. | |
| 6,985,523 B2 | 1/2006 | Sims et al. | |
| 2002/0131528 A1 | 9/2002 | Clewer et al. | |
| 2003/0165134 A1* | 9/2003 | Low et al. | 370/350 |
| 2003/0165208 A1* | 9/2003 | Carter et al. | 375/373 |
| 2004/0085892 A1* | 5/2004 | Walton et al. | 370/208 |
| 2009/0225914 A1* | 9/2009 | Ide et al. | 375/348 |
| 2011/0235762 A1* | 9/2011 | Cochran | 375/354 |

* cited by examiner

*Primary Examiner* — Leon-Viet Nguyen
(74) *Attorney, Agent, or Firm* — Potomac Technology Law, LLC

(57) ABSTRACT

A dynamic and flexible architecture and methods for demodulation of high data-rate streams with high symbol-rates, such as in satellite communications systems or computer network communications systems, is provided. A data stream of a data transmission is received, the data stream corresponding to a plurality of data symbols. A plurality of data samples corresponding to each of the data symbols is generated. Further, one or more representative data samples, corresponding each of the data symbols, are generated based at least in part on timing control signals and the generated data samples for the respective data symbol. The generated data samples corresponding to each of the data symbols other than the representative data samples are dropped. The timing control signals are then adjusted based at least in part on the generated representative data samples.

19 Claims, 18 Drawing Sheets

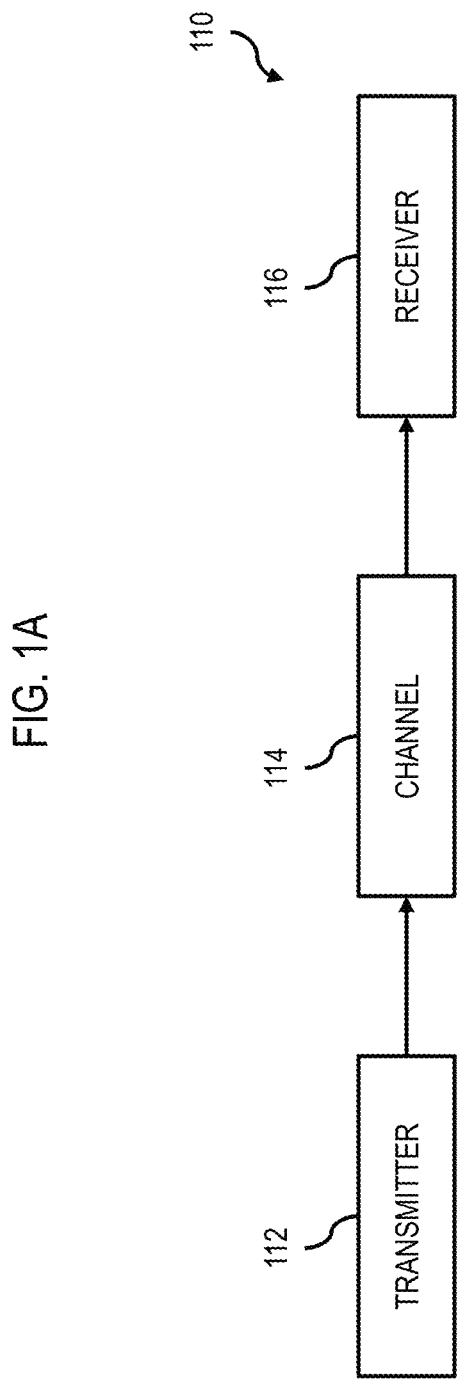

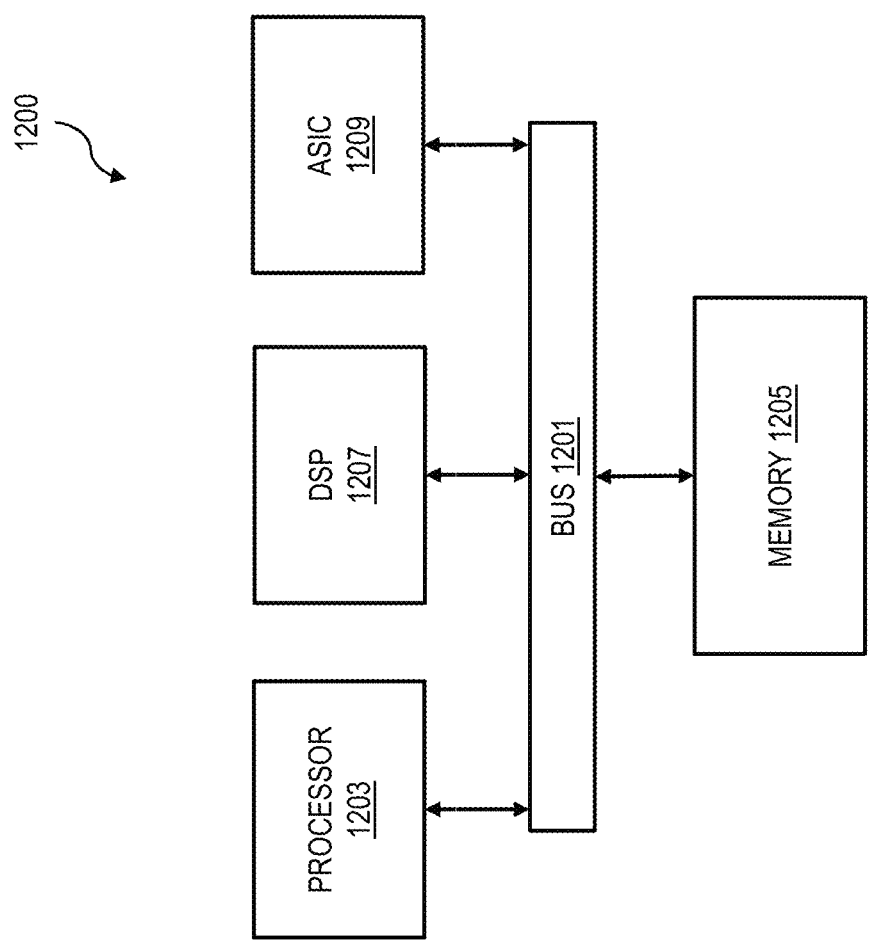

METHOD AND APPARATUS FOR PARALLEL DEMODULATION OF HIGH SYMBOL RATE DATA STREAMS IN A COMMUNICATIONS SYSTEM

FIELD OF THE INVENTION

The present invention relates to communications systems, such as satellite communications systems or computer network communications systems, and more particularly, to a parallel architecture and method for digital video broadcasting, second generation (DVB-S2) demodulation in satellite systems having data streams with high symbol rates for symbol timing recovery, such as at or below a clock rate for a modem that sends/receives signals in a satellite communications system.

BACKGROUND

The overall capacities of broadband satellites are increasing exponentially, and such capacity increases present unique challenges in the associated ground system and network designs. The goal of the system designers, system operators, and service providers is to support and provide efficient, robust, reliable and flexible services, in a shared bandwidth network environment, utilizing such high capacity satellite systems. Accordingly, current systems fail to adequately support efficient, robust, reliable and flexible broadband services, in such shared bandwidth network environments, in relation to demodulation of data streams with high symbol rates in high capacity satellite systems.

Examples of demodulation in satellite communications systems are described in U.S. Pat. No. 6,985,523 to Sims et al., titled "Method and System for Adaptive Equalization for Receivers in a Wide-Band Satellite Communications System," and in U.S. Patent Application Publication No. 2002/0131528 to Clewer et al., titled "System and Method of Parallel Partitioning a Satellite Communications Modem," the entireties of which are incorporated herein by reference. Further an example of automatic gain control and demodulation in satellite communications systems is described in U.S. Pat. No. 6,904,273 to Steber et al., titled "Method and System for Automatic Gain Control in a Satellite Communications System," the entirety of which is incorporated herein by reference. However, known systems, such as those disclosed in U.S. Patent Application Publication No. 2002/0131528, were directed to burst, or bursty, modes of data transmission, and, as such, were not specifically directed to dealing with data streams with high symbol rates for symbol timing recovery in a continuous mode of transmission.

However, when a burst modem is used for signal processing, there is typically not a significant degree of continuity between a first burst to the next burst, etc. from burst to burst. Therefore, where signals are received and processed in a continuous mode problems to be address are typically different from those addressed in a discrete burst mode of signal transmission, as well as differences are typically present in the underlying the parallelization are different in the continuous burst mode.

Therefore, to parallelize the functions of a demodulator to process continuous bursts, i.e. particularly for continuous mode data transmission, as opposed to intermittent, or bursty, data transmission in the burst mode of data transmission, typically requires a different solution from that in processing discrete bursts, so that the signal processing modules are different for continuous mode processing than in the burst mode processing. Also, the carrier recovery loop for processing data received in a burst mode from that received in a continuous mode is likewise typically different, such as related to the carrier recovery function. While the equalizer function is a burst mode and in the continuous mode can be similar, the functions in the continuous mode are typically more complex than in the burst mode, and the symbol timing recovery is also likely different.

Also, while a parallel finite impulse response (FIR) implementation is known in relation to DVB-S2 demodulation, deficiencies can be present as to the symbol timing interpolation and carrier recovery for demodulation. For example, one significant drawback in current designs of a wide-band DVB-S2 modem for processing data streams with high symbol rates for symbol timing recovery is that the maximum clock speeds for processing data are limited by the maximum clock speeds of known application specific integrated circuits (ASICs) for implementing DVB-S2 type demodulation. Also, parallel designs for feed-forward linear systems, such as FIR filters, are known, but problems still are present as to processing high data rate streams for symbol timing recovery.

Receivers require that signals be sampled at the rate of at least twice the symbol-rate. This typically requires that all front-end signal processing be performed at least at twice the symbol-rate, including that for the symbol timing recovery loop. In a traditional modem this requirement typically forces the processing clock frequency to be at least twice the maximum symbol-rate being processed. But, for high throughput systems that deploy high symbol-rates, such processing requirement places a difficult design constraint on the modem forcing it to use a high frequency processing clock. The high frequency processing clock adds tighter timing constraints on the physical design of the modem and, thus, makes it more expensive to design and manufacture.

While use of a parallel architecture can assist with high frequency processing, such as by processing N samples in parallel in each clock, theoretically it can be possible to achieve the such processing throughput by using a clock that is N times slower than the one used for the traditional serial design. However, symbol timing recovery loops use the temporal dependency between neighboring samples to process information and determine the ideal sampling point. And parallel designs have a drawback in that they break the temporal dependency between neighboring samples.

In this regard, a known approach to processing data streams with high symbol rates for symbol timing recovery is to utilize two narrow band demodulators, such as by attaching or channel bonding them together multiplex them. However such combination of two narrow band filters has significant drawbacks in that processing is not done as a single wideband filter. Another significant drawback is that combining the two narrow band filters in effect utilizes two narrow-band demodulators. As such, efficient and effective use of the channel or spectrum of the channel typically is degraded, particularly with respect to use of bandwidth capacity, bandwidth capacity being a commercially important consideration, as to cost considerations.

Achieving efficient, robust, flexible and fast broadband services, in such a high capacity, shared bandwidth, satellite system network, as to demodulation of data streams with high symbol rates, however, poses unique challenges to system designers and operators. For instance, receivers of data streams require the signals to be sampled at the rate of at least twice the symbol-rate. This typically requires that all front-end signal processing be performed at twice the symbol-rate (in-phase quadrature (I/Q) imbalance correction, gain correction, decimation, symbol timing recovery, and channel-equalization). In addition, the DVB-S2 carrier-recovery for pilot-on mode typically requires that the data segment be buffered and the certificate revocation list (CRL) runs at least once backward and once forward and combine the phase estimates from the two runs. In order to maintain adequate throughput, this also typically requires that the CRL be processed at least twice as fast as the symbol-rate. For high data-rate systems with high symbol-rates, such as in satellite communications systems, this typically requires a very fast clock. For example, a maximum symbol-rate of 225 Msps, for example, would require a modem processing clock of at least 450 MHz. Such a high clock speed would not be desirable in that it would impose severe timing constraints on any modem ASIC design for demodulation.

What is needed is a system design that employs a dynamic and flexible architecture and methods for demodulation of high data-rate streams with high symbol-rates, such as satellite communications systems, or for high capacity computer network systems, that reduces the speed requirement of the clock to be slightly greater than the symbol-rate instead of twice the symbol-rate. What is further needed is a parallel design for the symbol timing recovery loop that preserves the temporal dependency between neighboring samples.

What is also needed is architecture and methods for DVB-S2 type demodulators to process high data-rate streams with high symbol-rates, with samples coming in at a much faster rate than the system clock is able to run. Therefore, what is further needed is architecture and methods for DVB-S2 type demodulators that are capable of receiving and processing DVB-S2 streams with high symbol-rates at or below the clock-rate of a modem.

What is additionally needed is architecture and methods that substantially ease the timing constraints on ASIC design for demodulation, and provide for adequate throughput for such data streams, as well as would meet various requirements and desires associated with efficient, robust, reliable and flexible broadband services in a high capacity, shared bandwidth, satellite network, and that would be relatively efficient and automated from a network management standpoint.

SOME EXEMPLARY EMBODIMENTS

The present invention advantageously addresses the needs above, as well as other needs, by providing dynamic and flexible architecture and methods for demodulation of high data-rate streams with high symbol-rates, such as in satellite communications systems or computer network communications systems. The methods and apparatus, according to aspects of the invention, provide a novel parallel architecture for a demodulator (e.g., DVB-S2 type demodulator) that is capable of receiving data streams of high symbol rates for symbol timing recovery with symbol-rates at or below the clock-rate of the modem for demodulation, which meets various requirements and desires associated with efficient, robust, reliable and flexible broadband services in a high capacity, shared bandwidth, satellite network, and that is relatively efficient and automated from a network management.

According to exemplary embodiments and aspects of the invention, methods and apparatus, in accordance with the disclosure, provide a parallel architecture for an integer, as well as a fractional, symbol timing recovery loop, such as for a DVB-S2 type demodulator, that can receive data streams with virtually any symbol-rate ranging from a very low symbol-rate to a symbol rate that is N times the clock-rate of the modem, where 2N is the degree of parallelism in the design.

According to an exemplary embodiment, a method comprises receiving a data stream of a data transmission, the data stream corresponding to a plurality of data symbols. The method further comprises generating a plurality of data samples corresponding to each of the data symbols, and generating one or more representative data samples, corresponding each of the data symbols, based at least in part on timing control signals and the generated data samples for the respective data symbol. The method also comprises dropping the generated data samples corresponding to each of the data symbols other than the representative data samples, and adjusting the timing control signals based at least in part on the generated representative data samples According to a further exemplary embodiment, the method further comprises generating error correction signals, wherein the adjustment of the timing control signals is based at least in part on the error correction signals. According to a further exemplary embodiment, the generation of the error correction signals comprises determining phase errors corresponding to timing errors in processing the data samples, and filtering the phase errors.

According to another exemplary embodiment, an apparatus comprises at least one processor, and at least one memory including computer program code for one or more programs, the at least one memory and the computer program code configured to, with the at least one processor, cause the apparatus to perform at least the following functions. The apparatus is caused to receive a data stream of a data transmission, the data stream corresponding to a plurality of data symbols. The apparatus is further caused to generate a plurality of data samples corresponding to each of the data symbols, and to generate one or more representative data samples, corresponding to each of the data symbols, based at least in part on timing control signals and the generated data samples for the respective data symbol. The apparatus is also caused to drop the generated data samples corresponding to each of the data symbols other than the representative data samples, and to adjust the timing control signals based at least in part on the generated representative data samples. According to a further exemplary embodiment, the apparatus is caused to generate error correction signals, wherein the adjustment of the timing control signals is based at least in part on the error correction signals. According to a further exemplary embodiment, the generation of the error correction signals comprises determining phase errors corresponding to timing errors in processing the data samples, and filtering the phase errors.

According to another exemplary embodiment, an apparatus comprises a receiver module configured to receive a data stream of a data transmission, the data stream corresponding to a plurality of data symbols. The apparatus further comprises an interpolator module configured to receive a plurality of data samples corresponding to each of the data symbols, and to generate one or more representative data samples, corresponding to each of the data symbols, based at least in part on the generated data samples for the respective data symbol. The apparatus also comprises a sample dropper module configured to drop the generated data samples corresponding to each of the data symbols other than the representative data samples, and a symbol recovery module configured to adjust the timing control signals based at least in part on the generated representative data samples. According to a further exemplary embodiment, the symbol recovery module comprises a control module configured to generate timing control signals and drop control signals, wherein the interpolator module generates the representative data samples based at least in part on the timing control signals, and the sample dropper module drops the generated data samples corresponding to each of the input data symbols other than the representative data samples based at least in part on the drop control signals. According to a further exemplary embodiment, the symbol recovery module further comprises a filter configured to filter the representative data samples to provide one or more filtered data samples corresponding to each of the respective input data symbols, a phase detector configured to determine phase information regarding the filtered data samples, and a loop filter configured to filter the phase information, and to generate filtered phase information signals, wherein the timing control signals and the drop control signals generated by the control module are based at least in part on the filtered phase information signals. According to a further exemplary embodiment, the symbol recovery module further comprises an oscillator configured to generate the timing control signals and the drop control signals, wherein the drop control signals are generated based at least in part on a ratio between an incoming symbol rate and an outgoing sample rate for the input data stream.

Further, exemplary embodiments, apparatus, methods and aspects of the invention, in accordance with the disclosure, provide a parallel design for the symbol timing recovery loop that preserves the temporal dependency between neighboring data samples, such that recovery at substantially accurate symbol timing for a high symbol-rate signal using a parallel architecture and low processing clock speed is promoted.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A, 1B and 1C illustrate communications systems capable of employing an architecture and methods for demodulation of high data-rate streams, with high symbol-rates, for symbol timing recovery, in accordance with various exemplary embodiments;

FIG. 12 illustrates a chip set that can be utilized in implementing architectures and methods for demodulation of high data-rate streams, with high symbol-rates, for symbol timing recovery, in accordance with exemplary embodiments.

DETAILED DESCRIPTION

Figure 1B:
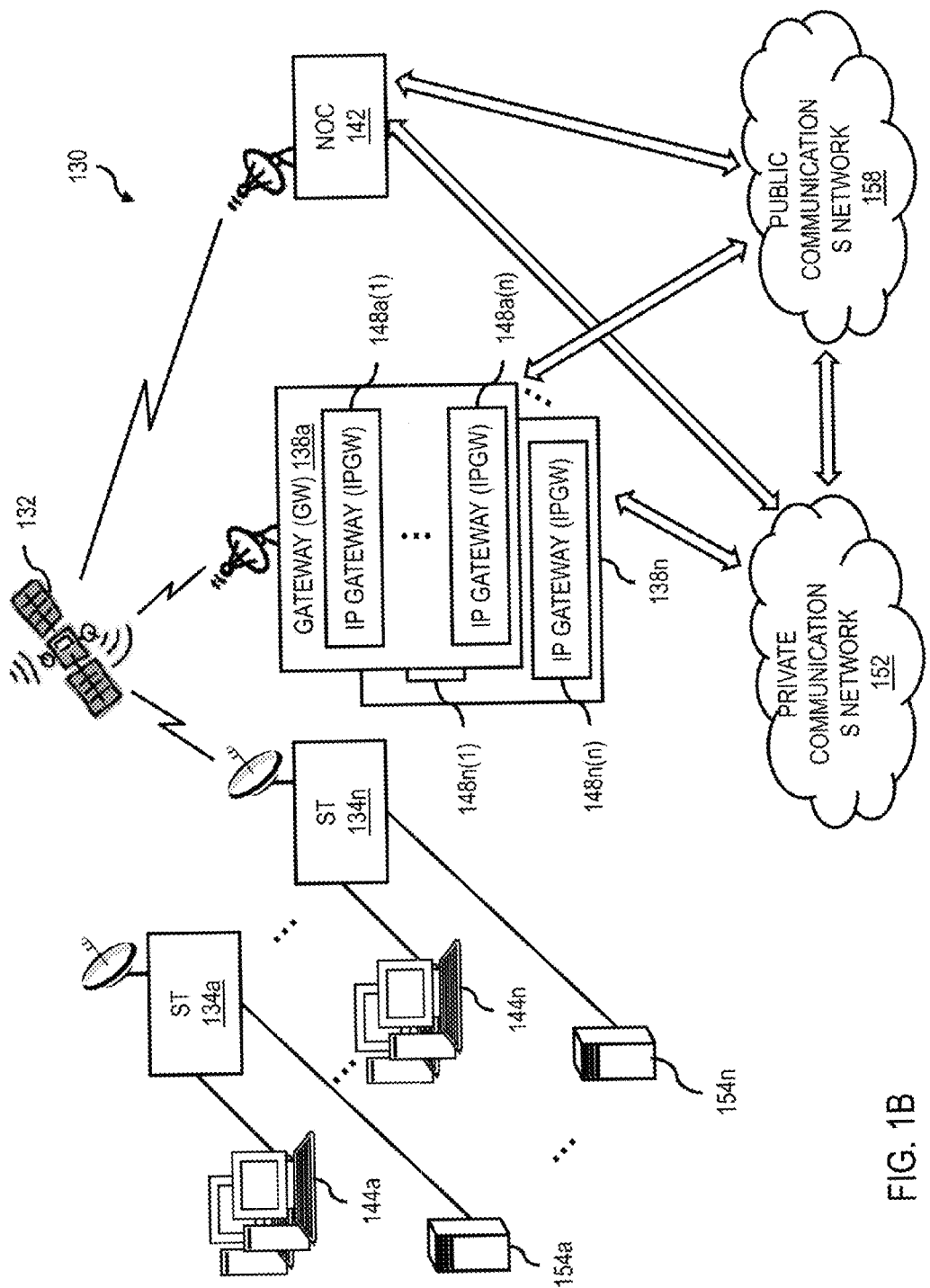

In accordance with an aspect of the present invention, dynamic and flexible architectures and methods are provided for demodulation of high data-rate streams with high symbol-rates for symbol timing recovery, which meet various requirements and desires associated with efficient, robust, reliable and flexible broadband services in a high capacity, shared bandwidth, satellite network, and that is relatively efficient and automated from a network management and load balancing standpoint.

In such a shared bandwidth network to which embodiments of the invention can be applicable, for example, where multiple remote nodes access broadband services through one or more aggregation nodes (e.g., gateways), according to various exemplary embodiments, the present architecture and method for association of remote nodes with respective aggregation nodes satisfies various requirements and desires related to the provision of efficient, robust, reliable and flexible broadband services. For example, based on the services for which a remote node (e.g., a user terminal or node) is configured (e.g., the services to which a user of the terminal has subscribed), the terminal utilizes one or more quantitative service criteria for selecting a pool of aggregation nodes that meet such service criteria. In other words, a terminal selects an aggregation node from an eligible pool of aggregation nodes or gateways that support service configurations and subscriptions that satisfy the service requirements of the terminal, such as for demodulation of high data-rate streams and with high symbol-rates for symbol timing recovery, in accordance with various exemplary embodiments can be utilized. For example, download throughput and download volume usage policy can represent two such quantitative service criteria that can be enhanced by exemplary embodiments and aspects of invention. The download throughput reflects the maximum speed (in Mbps) which a terminal is configured to sustain in the receive direction from the network, for user data. The download throughput can be based on the service plan to which the terminal is subscribed (e.g., based on the user service subscriptions). The download usage volume is the amount of data in MB or GB that a terminal is configured to receive from the aggregation node in the download direction before having its throughput throttled (e.g., based on a fair access policy of the service provider). The download usage volume can be based on an option selected by the user when signing up for a service plan. A terminal associates with an aggregation node by selecting a particular node (from a pool of suitable aggregation nodes available to the terminal) for provision of the required services to the terminal. Once the terminal completes an association process and the aggregation node accepts the association, the terminal becomes associated with the selected aggregation node.

Further, methods and architecture of the exemplary embodiments of the disclosure can enhance pooled redundancy and automatic and dynamic load balancing. Aspects of the disclosure, for example, can enhance load balancing as terminals enter the system, and can also load balance dynamically during operation of the system, particularly for demodulation of high data-rate streams with high symbol-rates for symbol timing recovery, utilizing various exemplary embodiments. In this regard, aspects of the disclosure can enhance the ability of terminals to more easily overcome aggregation node failures by load balancing across other active aggregation nodes of the same pool, which would save the requirement for one-to-one hot redundancy for recovering from hardware failures, particularly for high data rate streams. Also, aspects of the disclosure can also enhance the ability of terminals to dynamically transition to a diverse gateway, for example, when a gateway or communications link failure requires a transition to a secondary gateway (which, for example, can be a redundant gateway or an operational gateway at a diverse site). Moreover, embodiments and aspects of the disclosure can promote flexibility of modifying, enhancing or expanding the criteria for aggregation node pool creation and selection, for example, to expand or enhance service offerings, particularly as to high data rate streams.

In accordance aspects of the disclosure, for example, a shared bandwidth network having high data rate streams, can comprise a broadband satellite communications system, where multiple remote nodes (e.g., satellite terminals (STs)) access broadband services through one or more aggregation nodes (e.g., gateways (GWs) or IP gateways (IPGWs). For instance, different STs subscribe to different services, whereby the STs associate with respective IPGWs that support the respective services of the terminal. An ST would dynamically select an IPGW from an eligible pool of IPGWs that support service configurations and subscriptions that satisfy the service requirements of the ST. The ST associates with the selected IPGW for provision of the required services to the terminal. Once the ST completes an association process, and the IPGW accepts the association, the terminal becomes associated with the selected IPGW, such as for reception and demodulation of high data rate streams with high symbol rates.

Figure 1C:
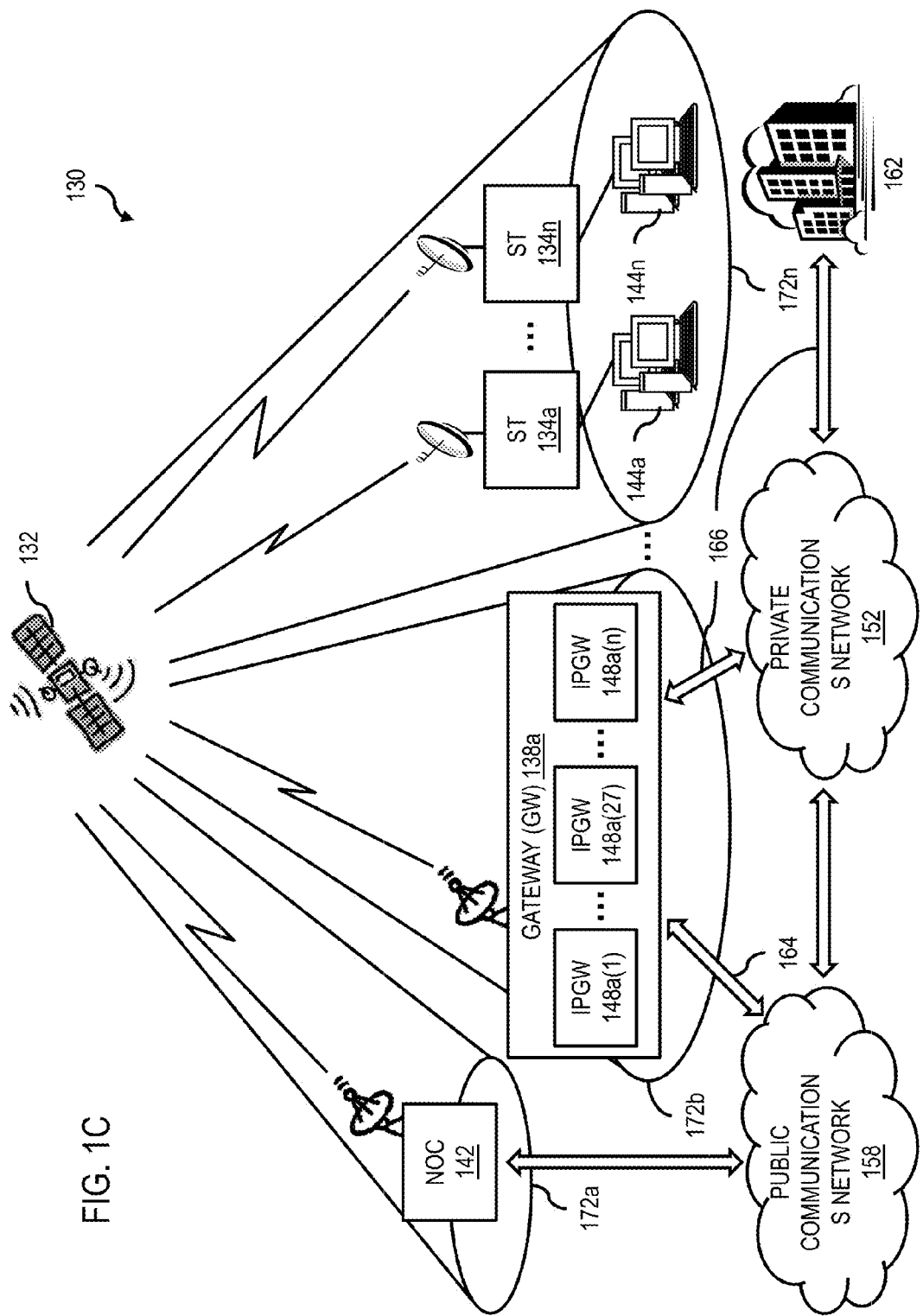

FIGS. 1A-1C illustrate communications systems capable of employing a dynamic and flexible architecture and methods for demodulation of high data-rate streams, with high symbol-rates, for symbol timing recovery, in accordance with various exemplary embodiments. With reference to FIG. 1A, a digital communications system 110 includes one or more transmitters 112 (of which one is shown) that generate signal waveforms across a communications channel 114 to one or more receivers 116 (of which one is shown). In this discrete communications system 110, the transmitter 112 has a signal source that produces a discrete set of data signals, where each of the data signals has a corresponding signal waveform. These signal waveforms are attenuated, or otherwise altered, by communications channel 114. To combat noise and other issues associated with the channel 114, coding can be utilized. For example, forward error correction (FEC) codes can be employed.

FIG. 1B illustrates an exemplary satellite communications system 130 capable of supporting communications among terminals with varied capabilities, according to exemplary embodiments of the present invention. Satellite communications system 130 includes a satellite 132 that supports communications among multiple satellite terminals (STs) 134a-134n, a number of gateways (GWs) 138a-138n, and a network operations center (NOC) 142. The NOC 142 performs the management plane functions of the system 130, while the GWs 138a-138n perform the data plane functions of the system 130. For example, the NOC 142 can perform such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 can communicate with each GW via the satellite 132, or via a secure private communications network 152 (e.g., an IPsec tunnel over a dedicated link or a virtual private network (VPN) or IPsec tunnel through a public network, such as the Internet). Additionally, each GW and the NOC can have connectivity to one or more public communications networks, such as the Internet or a PSTN.

According to further exemplary embodiments as can utilize aspects of the disclosure, each of the GWs 138a-138n can include one or more gateways (IPGWs)—whereby the data plane functions are divided between a GW and its respective IPGWs. For example, GW 138a can include IPGWs 148a(1)-148a(n) and GW 138n can include IPGWs 148n(1)-148n(n). A GW can perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW can perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW can be collocated with the NOC 142. The STs 134a-134n can provide connectivity to one or more hosts 144a-144n and/or routers 154a-154n, respectively. The satellite communications system 130 can operate as a bent-pipe system, where the satellite essentially operates as a repeater or bent pipe. Alternatively, the system 130 can employ a switching or processing satellite supporting mesh communications (point-to-point communications directly between, for example, the two STs 134a and 134n).

In a communications system 130 that employs a processing satellite (e.g., including a packet switch operating, for example, at a data link layer), the system can support direct unicast (point-to-point) communications and multicast communications among the STs 134a-134n and GWs 138a-138n, such as for high data rate streams. In the case of a processing satellite, the satellite 132 decodes the received signal and determines the destination ST or STs and/or GWs. The satellite 132 then addresses the data accordingly, encodes and modulates it, and transmits the modulated signal to the destination ST or STs (e.g., ST 134n) and/or GWs (and their respective IPGWs). The system 130 thereby provides a fully meshed architecture, whereby the STs 134a-134n can directly communicate, via a single hop, over the satellite 132.

In utilizing aspects of the disclosure, in a bent-pipe system, the satellite 132 operates as a repeater or bent pipe, and communications to and from the STs 134a-134n are transmitted over the satellite 132 to and from respective IPGWs associated with particular STs, such as for communications in relation to high data rate streams. Further, in a spot beam system, any one spot beam (e.g., beams 172a-172n) operates as a bent-pipe to geographic region covered by the beam. For example, each spot beam operates as a bent pipe communications channel to and from the STs and/or IPGW(s) within the geographic region covered by the beam. For example, several GWs/IPGWs are distributed across the geographic region covered by all spot beams of the satellite 132, where, in a beam in which a GW (and respective IPGWs) are located, only the one GW (and no STs) occupies that beam. Further, each IPGW can serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1C, for example, for a data communications from ST 134a to a public communications network 158 (e.g., the Internet), the ST 134a can be associated with an IPGW (e.g., IPGW 148a(1)—selected from a pool of IPGWs available to the ST 134a, such as IPGWs 148a(1)-148a(27)—where the pool of IPGWs is a suitable subset of the IPGWs 148a(1)-148a(n) located at the GW 138a). The data is first transmitted, such as a high data rate stream, via the satellite 132, from the ST 134a to associated IPGW 148a(1). The IPGW 148a(1) determines the destination as being the Internet 158. The IPGW then repackages the data (e.g., as a TCP/IP communications), and routes the data communications, via the terrestrial link 164, to the Internet 158. Further, in a corporate network, for example, a corporation can deploy various remote STs at remote offices. More specifically, ST 134n, located at a remote corporate location, can desire to securely communicate with the corporate headquarters 162. Accordingly, for a data communications from ST 134n to the corporate headquarters 162, the data is first transmitted, via the satellite 132, from the ST 134n to an IPGW associated with the ST 134n (e.g., IPGW 148a(27)). The IPGW 148a(27) determines the destination as being the corporate headquarters 162. The IPGW then repackages the data (e.g., as an IPsec communications), and routes the IPsec data communications, via the secure terrestrial links 166 (over the private network 152), to the corporate headquarters 162. In the corporate network scenario, a further example can involve a corporate communications, such as in the format of high data rate streams, from the corporate headquarters to a number of remote sites (e.g., a multicast communications to STs 134a-134n)—where STs 134a-134n are correspondingly associated with the two IPGWs 148a(1) and 148a(27) (e.g., grouped between the two IPGWs based on load balancing and IPGW capabilities). In this scenario, a gateway or router, within the local network of corporate headquarters 162, transmits the data communications, via the secure terrestrial links 166 (over the private network 152), to the IPGWs 148a(1) and 148a(27). The IPGWs determine that the communications is destined for the remote STs 134a-134n, and package the data as a multicast communications addressed to the community of STs 134a-134n. The IPGWs then transmit the data communications, via the satellite 132, for decoding by the community of STs 134a-134n, for demodulation and reception of the high data rate streams, for example. Accordingly, the satellite of such a system acts as a bent pipe or repeater, transmitting communications between the STs 134a-134n and their respective associated IPGWs 148a-148n.

Moreover, according to aspects of the disclosure, STs performing of dynamic load balancing at various different levels can be enhanced, particularly as to load balancing for high data rate streams. For example, according to one such embodiment, a group of STs can perform load balancing across IPGWs of a pool of IPGWs servicing an outroute accessible to the group of STs. According to a further embodiment, depending on the architecture and configuration of the network, STs can perform load balancing across multiple outroutes of multiple IPGWs (either within a single satellite beam or across geographically diverse IPGWs), where the messaging to and from the various IPGWs is directed by the satellite to the beam(s) within which the STs are located, and on channels that the STs are capable of accessing, such as messaging in the format of a high data rate stream. Therefore, the various exemplary embodiments of the disclosure can enhance the capability of the STs for dynamic and flexible IPGW association, based on the IPGW messaging available to an ST at any given moment, such as by the enhancing the ability to process high data rate streams. Accordingly, embodiments and aspects of the disclosure achieve several advantages in such shared bandwidth networks.

The architectures, methods and aspects of the invention, such as can be utilized in satellite communications systems or computer network communications systems, and more particularly, in a parallel architecture and method for digital video broadcasting, second generation (DVB-S2) demodulation in satellite systems having data streams with high symbol rates for symbol timing recovery, according to exemplary embodiments of the present invention, can be implemented, at least in part, by one or more chip sets, including one or more processors and memory, as illustrated in FIG. 12 (showing one such processor). The chip set 1200 can be incorporated into the STs and/or GWs/IPGWs, for example, and as such, the chip set 1200 provides a means for accomplishing various parts of the algorithms and protocols herein described and illustrated. Further, different aspects of such algorithms and protocols can be allocated to the components of the chip set, as would be prudent based on design choices that would be apparent to one of skill in the art.

Digital communications systems typically use a symbol as a basic using of information in the transmission signal. The rate at which the symbols appear in the transmission signal determines the information throughput of the system. The throughput is typically expressed in "mega symbols per second" (Msps). In digital receiver modems, for example, the received analog signals are typically sampled at a rate that is greater than twice the symbol-rate of the signal, which is typically a minimum theoretical requirement for recovering the information present in the symbols. In modems that support several symbol-rates, the sampling rate is usually kept unchanged and is typically greater than twice the largest expected symbol-rate. The analog to digital converter (ADC) blindly samples the incoming signal at a constant rate without regard what sampling time is optimal to represent the symbol.

Subsequently, in the demodulator, the modem determines which of the samples optimally represents the information contained in the symbols. Sometimes, the optimal symbol timing resides in-between two samples. And the modem typically interpolates between these samples to obtain the optimal sampling point. The function of the symbol timing recovery loop is to determine the peak (optimal) sample, and the zero-crossing (middle between two neighboring peaks) sample. The input to a symbol timing recovery loop is a signal that, for example, contains between 2 and 4 samples-per-symbol and the output is a signal that contains typically two samples-per-symbol, i.e. one sample at the peak and one sample at the zero-crossing. Prior to the symbol-timing recovery loop, linear decimation half-band filters can be employed to bring the signal down to the sampling-rate of 2-4 samples-per-symbol, according to aspects of the disclosure.

The exemplary embodiments, methods and aspects of the invention are driven by the processing capabilities for demodulators, such as DVB-S2 demodulators, to efficiently and effectively perform real-time continuous symbol timing recovery using a clock that is typically N times slower than the symbol-rate to advantageously process data signals for high data-rate streams and high symbol-rates received in a continuous mode of data signal transmission to enable symbol timing recovery at lower clock speeds of current ASIC designs. Typically, according to aspects of the invention, for such data signal processing, a modem typically would need to be running from one mega samples per second to 225 mega samples per second, for example, but typically there is only one A/D clock, so processing is typically run with the same A/D clock and as such, that clock will usually not always be a multiple of the symbol rate.

According to aspects of the invention, signal processing can be efficiently and effectively accomplished over a wide sampling range, such as from one mega samples per symbol at 80 MHz to 480 samples per symbol, and including two samples per symbol at the higher rates. Also, according to aspects of the invention, sampling can also be fractional and fractional timing can also be employed as, for example, at 1.43 mega samples, as well as sampling at a multiple of the symbol rate.

While aspects of the invention can be applied to signal processing for a burst, or bursty, mode of signal transmission, methods, apparatus and aspects of the invention are particularly applicable and advantageous for demodulation of data signals transmitted and received in a continuous mode of data signal transmission. In this regard, in contrast to the burst modem, in the continuous modem, the data signal is basically continuous and can have a wide range of symbol rates to accommodate, and fractional timing and fractional symbol sampling can add to the complexity for effective and efficient signal processing, particularly as to adds/drops in sampling.

In the signal processing, the demodulator typically generates soft decisions at the output which then are provided into the decoder. However, because of certain constraints, such as symbol rates for symbols to be processed that are significantly increasing, such as at a rate of five times or more over previously rates, for example, to achieve efficient and effective processing of these higher symbol rates, can be problematic given cost constraints and the current ASIC designs for demodulators and the speed of clocks needed to run the ASIC demodulation chips. The exemplary methods, apparatus and aspects of the invention effectively and efficiently enable demodulation processing at a clock rate substantially equal to the rate at which the data is coming in, without substantially increasing or consuming the processing time, such as to twice the time, as can be needed with traditional processing to keep up with the data rate of the data being received for processing.

Therefore, according to aspects of the invention, a parallel implementation is provided for the signal processing that enables a significant reduction is the signal processing time for high data rate streams to be processed. Such exemplary embodiments, according to aspects of the invention, implement a processing time that typically only consumes half the time going forward and half the time going back for processing in the demodulator, so that the total processing time would substantially keep up with the data rate that is coming in for processing, for example. Thus, method and apparatus, according to aspects of the invention, can advantageously process data signals for high data-rate streams and high symbol-rates received in a continuous mode of data signal transmission to enable symbol timing recovery at lower clock speeds of current ASIC designs, in a cost effective, efficient and effective manner.

Figure 2A:
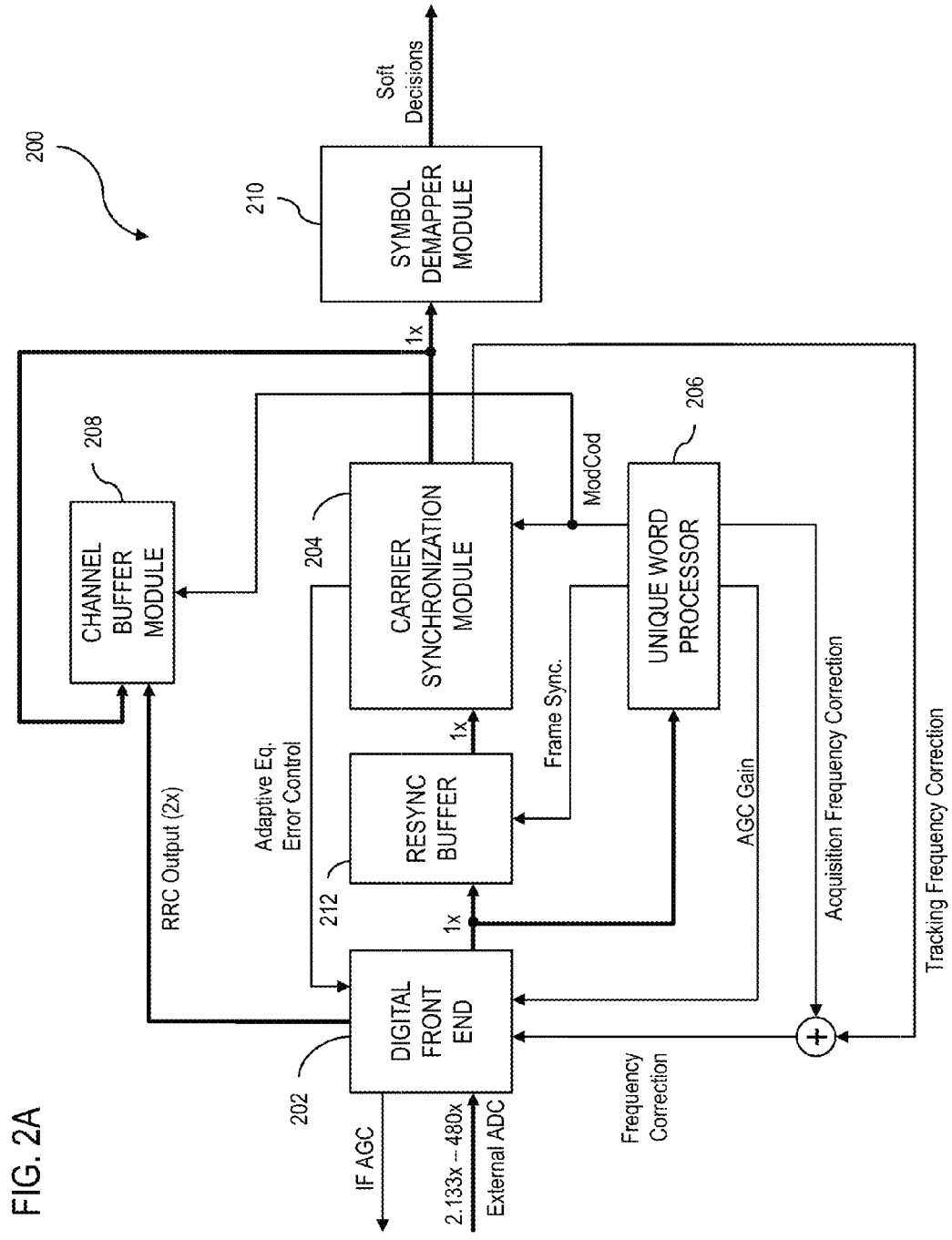
FIG. 2A illustrates a block diagram of a demodulator (e.g., a DVB-S2 type demodulator), in accordance with exemplary embodiments.

FIG. 2A illustrates a block diagram of a demodulator (e.g., a DVB-S2 type demodulator), in accordance with exemplary embodiments. The demodulator, for example, may be implemented as a System-on-Chip (SoC), such as for satellite communications systems or computer network communications systems. Also, the various control signals, inputs, outputs and data processing flow in the demodulator 200, are further identified, illustrated and described in and with reference to FIG. 2A, according to aspects of the invention. In such a DVB-S2 type demodulator, one challenge in the processing of high date rate streams is that data rates typically are received for processing at a fairly high sampling rate, such as 480 mega samples per second, and processing such data streams and data flow for symbol timing recovery. As a result it typically can be difficult to implement an ASIC that can process data at such relatively high data rates.

According to aspects of the invention, methods and apparatus are provided that can process the samples at a lower clock speed, such as in a DVB-S2 type demodulator of FIG. 2A, so that ASIC(s) utilized for the demodulator can run at that lower clock speed and then process these samples in parallel. So, for example, according to aspects of the invention, where the demodulator is running at a rate "r" and the clock speed is one half of that rate for example, according to aspects of the invention, the data can then be processed at two samples at the same time. Thus, by such parallel processing, according to aspects of the invention, the demodulator can substantially keep up with the rate of the samples coming in the demodulator to process the data efficiently.

Referring to FIG. 2A, in the demodulator 200, the input data (e.g., $I_{even}$, $Q_{even}$ and $I_{odd}$, $Q_{odd}$) is received by a receiver of the demodulator 200, such as the Digital Front End (DFE) 202. Data samples are provided from the DFE 202, via the Resynchronization Buffer or Resync. Buffer (RB) 212, to the Carrier Synchronization Module (CSM) 204. Also, according to aspects of the invention, the received data in the data stream can be transmitted in either a "pilot-on" or a "pilot-off" mode, for example. Pilot presence, results from a pilot symbol being inserted into the data stream, where in a "pilot-off" mode the data is transmitted back to back, and in a "pilot-on" mode a special known symbol is inserted between data groups or samples in the transmitted data stream, such as to indicate data groups or for timing, for example.

The Unique Word Processor (UWP) 206 is a frame timing determining block, for example. The UWP 206 looks at the data coming in, and determines the start of a frame, the data being divided into frames which are packets of information, and generates frame synchronization control signal pulses for frames of the input data, which are provided to the RB 212. Based on the frame sync. signal, the data samples are provided to the CSM 204, in sync with the PL-Frame (based on the unique word for the frame). The CSM 204 also outputs adaptive equalizer error control signals to the DFE 202, for error adjustment. Data processed in the CSM 204 is provided to the Symbol Demapper Module (SDM) 210 to demodulate the input symbols into data bits, as well as for providing soft-decisions. The signals and data processing flow in the demodulator 200 are further illustrated and described in and with reference to FIG. 2A.

Initially, the data stream is transmitted, either in a continuous mode transmission or a burst mode transmission, and is received by a terminal device or receiver (e.g., the receiver 116 of FIG. 1, or the STs 134a to 134n of FIGS. 1B and 1C). The received transmission signal is downconverted by the receiver terminal, and an analog to digital converter or ADC (not shown) converts the analog signal into digital samples, with a plurality of digital samples being generated corresponding to each input data symbol (based on the sampling rate), which are fed to the DFE 202 (e.g., per the External ADC data line flowing into the DFE 202, as per FIG. 2A). For example, at a sampling rate of upwards of approximately 480 Mega-symbols per second (Msps). Further, for example, in accordance with an exemplary embodiment, because the clock (e.g., an mclk of 240 MHz) is half the rate of the incoming sampling rate (e.g., 480 Msps), all signal processing in the DFE is performed using a parallel implementation that processes two samples per clock pulse. In other words, the input signal is sampled at a constant 480 Msps (e.g., the samples are at 2.13 samples per symbol (sps) (e.g., for a data stream received at 225 Msps, such as a DVB-S2 data stream). Accordingly, employing a 240 MHz clock, the data is processed at 480 sps (for 1 Msps), in a parallel fashion, for example. Accordingly, based on the 2.13 sample per symbol rate, resampling and sample dropping are employed to generate optimal sampling per symbol at a rate of exactly 2 samples per symbol.

Further, the DFE 202 decimates and re-samples the input signal and performs Root-Raised Cosine (RRC) matched filtering on it, such as to generate 1 sps signal. This generated 1× signal is fed to the UWP 206, as well as to the CSM 204 (via the RB 212). The UWP 206 correlates the protocol layer header, i.e. the PL-header, with the received signal to determine the timing offset and coarse frequency offset in the received signal. In addition, the UWP 206 demodulates and decodes the ModCod in the PL-header to determine the modulation type. The UWP 206 then re-encodes the ModCod and passes it on to the CSM 204 for fine frequency offset estimation. The timing offset information is passed to the CSM 204 in the form of a frame-sync pulse. The coarse frequency offset is passed to the DFE 202 to control the digital frequency mixer. In addition, the UWP 206 estimates the power in the received signal and sends gain error signals to the baseband automatic gain control (AGC) in the DFE 202.

The DFE 202 forwards the 1× samples to a buffer (e.g. the Resync. Buffer 212) to facilitate and ensure frame synchronization based on the frame-sync from the UWP 206, to line up the start of the PL-frame. The time aligned samples are then used in estimating any residual phase errors using the known, re-encoded PL-header and known pilot symbols. The estimated phase error is used to correct the received symbols by rotating them. Additionally, the estimated phase error is used to compute a fine frequency correction which is fed back as a frequency correction factor to the mixer of the DFE 202.

Also, an error control signal is generated using the known header and pilot symbols that is fed back to the DFE 202, where it is used to adaptively equalize the matched filtered samples. The phase corrected symbols are de-mapped to generate the soft-decisions that are sent to the forward error correction (FEC) decoder block.

Again, with reference to the CSM 204, according to exemplary embodiments, in demodulating the received signal, the blocks of data coming in to the demodulator 200 have to be processed and stored, the data then being processed in one direction and then processed in the reverse direction, prior to the processed data being sent from the demodulator 200. However, in performing such processing, there is typically required twice the time for each block of data, because the data is traversed in the one direction and then traversed in the return direction. And, therefore, in current systems for demodulation, such as where data are in a parallelized format for processing, it typically can be difficult to keep up with the data being received, such as where the clock speed is equal to the data speed, and data processing would typically be at twice the speed, particularly for data being processed in a continuous mode of signal transmission.

A carrier recovery loop (CRL) in the DFE 202, for example, in conjunction with the CSM 204, effectively and efficiently can process data samples at a rate of two samples at substantially the same time, for example, with the results of the data processing being combined to substantially achieve the forward and reverse traversal of the data being processed in approximately half the time, whereby the total data time consumed in processing one block of data is substantially equal to the rate at which the data is being received for processing. Therefore, according to aspects of the invention, the processing of the data can substantially keep up with the data rate of the data being received, particularly for data being received in the continuous mode of signal transmission.

Further, according to exemplary embodiments, the input data in the data signal received by the demodulator, such as demodulator 200, is desirably processed in a parallelized format implemented using a carrier recovery (CR) loop in the DFE 202, to be further described, in conjunction with the CSM 204 in FIG. 2A, as discussed herein. The input data signal can likewise be further broken down into a plurality of data segments greater than two (2), and the circuitry within the demodulator 200 can be modified accordingly to process such plural data segments at a sampling rate greater than the symbol rate of the received data, such as at a rate that is at least twice the symbol rate, for data streams with high symbol rates for symbol timing recovery, according to aspects of the invention.

Further, among the functions the CSM 204 performs in signal processing include, for example, estimating and removing any residual carrier phase offset, and estimating any residual carrier frequency offset. In the pilot-on mode, for example, the CSM 204 works on an entire stored data segment after its starting and ending phases have been estimated from the preceding and succeeding unique words, respectively. In the CSM 204, a CRL is swept in the forward direction, and in the reverse direction, and the phase estimates from the two sweeps are averaged to obtain the residual carrier phase in the signal which is then removed in the post-sweep operation. Buffers associated with the CSM 204 are used to store one whole data segment each (such as 1440 symbols, for example) in a ping-pong type arrangement, for example. While the sweeper in the CSM 204 is working on one data segment in one buffer, the next data segment is loaded into another buffer, and vice-versa. A further buffer is typically used to hold a last data segment, in that the last data segment could be smaller than a whole segment, for example.

In the CSM 204, the reverse sweep is typically performed first, followed by the forward sweep and the post-sweep together, i.e. using a sweeper and post sweeper combination, desirably to enable parallel processing within the sweepers, to enhance processing at desirably twice the data rate, according to aspects of the invention. Therefore, for any data segment of length L, typically at least 2L clocks are typically used to finish the operation by the CSM 204. Where the CRL is processed at 1 symbol per clock, for example, it typically can be difficult to keep up with the throughput, such as at throughput of 240 Msps using a 240 MHz clock. According to aspects of the invention, to process data received at such relatively high data rates, the demodulator 200 desirably processes the received data at a rate of two symbols per clock, whereby two consecutive incoming symbols are stored together in one memory location, to enable the symbols to be read and processed in a parallel format, for example.

Further, according to aspects of the invention, in processing the received data in the CSM 204, when the backward sweep starts, two symbols are typically read substantially simultaneously from the buffer. A parallel numerically controlled oscillator (NCO) typically associated with the DFE 202 determines the phase rotation required for even and odd symbols by adding F and 2F to the current NCO phase, where F is the frequency. Further, it is desirable that the phase-error loop-filter runs at half the symbol-rate and typically generates one phase error for the two samples. This error is desirably added to both the NCO phases and these new phases can used to rotate the incoming data samples to the demodulator 200, according to aspects of the invention. The two parallel rotated symbols are then fed to two parallel phase error look-up tables to generate two phase errors. The two phase errors are typically added and divided by 2, for example, to obtain an average phase error for the two parallel symbols. This average phase error is desirably filtered using a second order loop-filter to generate one filtered phase error for every two symbols. Therefore, according to aspects of the invention, a data segment of length L symbols desirably can be processed using approximately L clocks.

According to aspects of the invention, the CSM 204, in conjunction with exemplary embodiments of a carrier recovery (CR) loop in the DFE 202, to be further described herein, enable processing of data streams with high symbol rates for symbol timing recovery, such as processing data in demodulator 200 at the data rate of the data transmission, e.g. the rate of two symbols per clock, particularly for a continuous mode of data transmission, thereby advantageously promoting substantially maintaining the throughput of the data to be processed. Further, the 1× data samples can be forwarded to a Channel Buffer Module (CBM) 208 for debugging purposes.

Figure 2B:
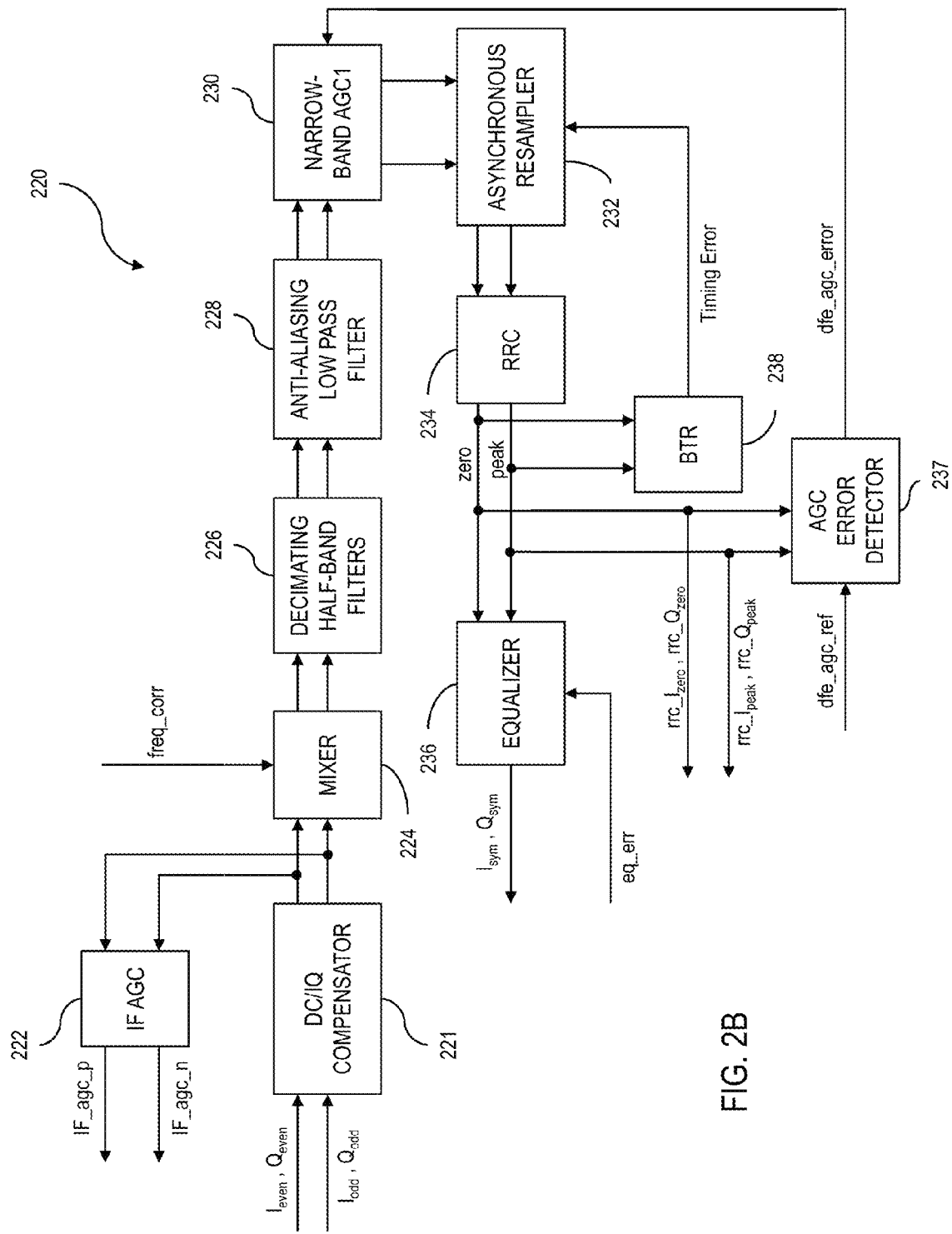
FIG. 2B illustrates a block diagram of an exemplary digital front end (DFE), as can be utilized in the demodulator of FIG. 2A, in accordance with exemplary embodiments.

FIG. 2B illustrates a block diagram of an exemplary digital front end (DFE), as can be utilized in the demodulator of FIG. 2A, in accordance with exemplary embodiments. Also, the various control signals, inputs, outputs and data processing flow in the DFE 220 are further identified, illustrated and described in FIG. 2B and with reference to the exemplary embodiments of FIGS. 3A and 3B, according to aspects of the invention.

The typical functions of the DFE 220, according to aspects of the invention, can include the following: compensate and correct for any direct current (DC) offset in the received signal; compensate and correct for any in-phase/quadrature-phase (I/Q) phase imbalance in the received signal; compensate and correct for any I/Q amplitude imbalance in the received signal; estimate the received wideband received signal strength indicator (RSSI) and, based on this estimate, generate a pulse density modulated (PDM) gain control for the intermediate frequency automatic gain control (IF AGC) in a tuner, such as a Maxim tuner; remove any estimated frequency offset in the received signal; decimate the received signal desirably down to 2 (symbols per second) SPS; resample the received signal to select the peak root raised cosine (RRC) sample; correct the gain of the received baseband samples so that maximum bit-resolution is achieved after the narrowband RRC filtering; and perform channel equalization of the received signal.

As specified above, according to one exemplary embodiment, because the master clock (240 MHz) is half the rate of the incoming sampling rate (480 mega-samples per second), signal processing in the DFE 220 is desirably performed using a parallel implementation that processes two samples in every clock, according to aspects of the invention. However, the input data signal can likewise be further broken down into a plurality of data segments greater than two (2), as previously discussed. Typically, according to aspects of the invention, the signals being processed between the blocks in the DFE 220 are two sets of samples, $I_{even}$, $Q_{even}$ and $I_{odd}$, $Q_{odd}$. The top set of samples are the even set of samples, i.e., $I_{even}$, $Q_{even}$, which is an early set with samples 0, 2, 4, etc. The bottom set of samples are the odd set of samples, i.e., $I_{odd}$, $Q_{odd}$. This is the late set with samples 1, 3, 5, etc. These parallel sets of data are maintained even when the DFE 220 is configured for the slower symbol rates. The signal and data processing flow in the DFE 220, is further illustrated and described in and with reference to FIG. 2B.

Continuing with reference to FIG. 2B, for example, the incoming samples are first compensated for DC offset and I/Q phase and amplitude imbalances in the DC/IQ Compensator 221. Dedicated hardware circuitry in the DC/IQ Compensator 221 adaptively estimates the offsets and imbalances for each incoming sample. The estimations are adapted once for each set of two parallel input samples. A single estimate is typically produced using the set of two parallel input samples. A processor associated with the DC/IQ Compensator 221 programs the loop gains of these estimation filters. The single estimated set of imbalances is used to compensate both output samples in parallel.

The samples from the DC/IQ Compensator module 221 are provided to a wideband intermediate frequency automatic gain control (IF AGC) module 222 of the DFE 220. In the IF AGC 222, the powers of the two parallel samples are estimated substantially simultaneously and then averaged to obtain an instantaneous power estimate. This average power estimate is subtracted from a reference value to obtain an error in power. These accumulated errors are filtered typically using a first-order loop filter with configurable loop-gain. The filtered error signal forms the control word for a sigma-delta digital to analog converter (DAC) that generates a differential pulse density modulated (PDM) output signal. This PDM signal is fed to the IF AGC located in the tuner, such as the Maxim tuner. Therefore, although the loop-filter runs at the half the rate of the sampling rate, the loop filter can still use the average power from the two parallel samples, according to aspects of the invention.

The output from the DC/IQ Compensator 221 is also provided to a Complex Mixer 224, wherein the I/Q and DC offset compensated samples pass through the Complex Mixer 224 that corrects for any residual frequency offset in the baseband signals. The true frequency offset value used by the Complex Mixer 224 is typically the sum of the nominal frequency offset, the coarse acquisition frequency offset estimated by the UWP 206 and the fine tracking frequency offset estimated by the CSM 204. A single NCO increments its phase by the frequency correction, once for each set of parallel input samples. The NCO phase value incremented by the frequency once is used to rotate the even input sample. The NCO phase value incremented by the frequency twice is used to rotate the odd sample. These two rotations are performed in parallel, according to aspects of the invention.

The output from the Complex Mixer 224 is provided to the Decimating Half-band Filters 226. The Decimating Half-band Filters 226 include, for example, seven identical half-band filters with 31 taps (16 non-zero taps). The parallel input samples are loaded into two tap-delay lines in the Decimating Half-band filters 226. One media access control (MAC) unit associated with the Decimating Half-band Filters 226 is used to calculate one output sample for every set of two input samples. The output samples are demultiplexed into two parallel output samples by the Decimating Half-band Filters 226. One set of parallel output samples are generated for every two sets of parallel input samples by the Decimating Half-band Filters 226. Also, typically, separate, identical real half-band filters of the Decimating Half-band Filters 226 are instantiated to filter the in-phase samples and the quadrature samples, for example.

The output from the Decimating Half-band Filters 226 is provided to an Antialiasing Lowpass Filter (LPF) 228. The Anti-aliasing LPF 228 performs final antialiasing filtering on the data samples before the data samples are provided to the Narrowband AGC1 module 230, the Narrowband AGC1 230 corrects the gain of the received baseband samples, based on an error correction signal from an AGC Error Detector 237, so that maximum bit-resolution can desirably be achieved after the narrowband RRC filtering. The output of the Narrowband AGC1 230 is then provided to the Interpolator 232, which generates 2 symbols per data sample, for example. The Anti-aliasing LPF 228 includes, for example, two parallel tap-delay lines that feed into two parallel MAC units. Also, for example, every input sample pair generates an output sample pair. Typically two identical LPF filters are instantiated for the in-phase and quadrature components of the signal, for example.

Continuing with reference to FIG. 2B, the Bit Timing Recovery (BTR) module 238, the raised-root-cosine (RRC) filter 234 and the Interpolator or Asynchronous Resampler 232 form a symbol timing recovery loop (STRL) (or bit timing recovery loop), such as can be used for symbol timing recovery, in embodiments according to aspects of the invention. The STRL enables bit or symbol timing recovery, in parallel processing of the data, such as in the processing of two samples substantially simultaneously. The STRL recovery loop, as discussed further herein, takes into consideration a temporal dependence between samples for processing the data samples in a parallel, or plural, format.

The output of the RRC filter 234 is provided to a narrowband Equalizer 236 that performs narrowband channel equalization of the received symbols. For example, the narrowband Equalizer 236 includes a 25-tap complex finite impulse response (FIR) filter covering 12 symbols. The narrowband Equalizer 236 receives the signal at a sampling rate that is typically twice the symbol-rate (peak and zero-crossing) as parallel samples. These samples are latched into a tapped delay line of length 25 of the 25-tap complex finite impulse response (FIR) filter, for example. The narrowband Equalizer 236 determines the filtered output for the peak samples and, therefore, for each symbol-enable, two samples are pushed in and one sample is pushed out of the FIR filter, for example.

Figure 2C:
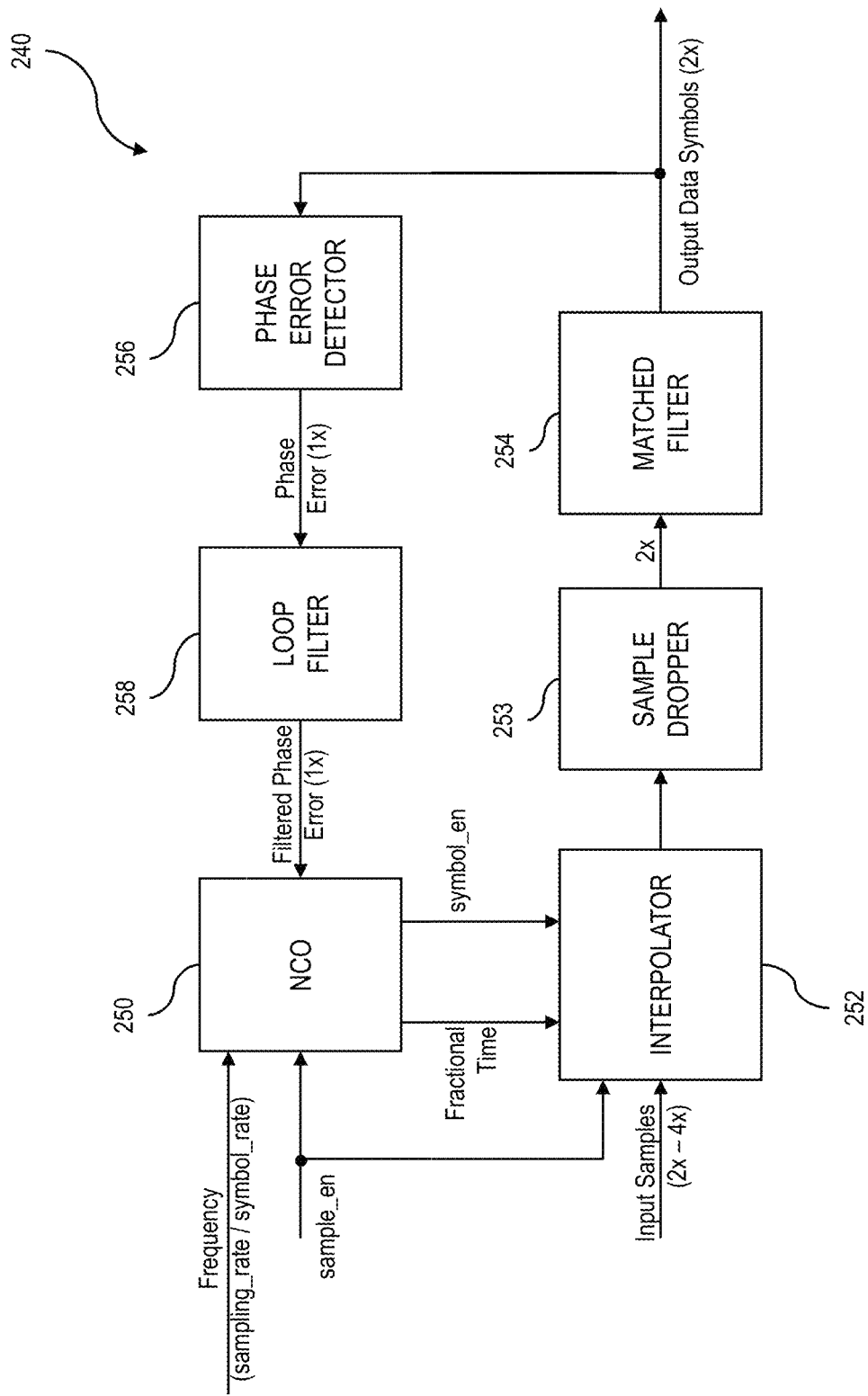
FIG. 2C illustrates a block diagram of an exemplary symbol timing recovery loop (STRL) circuit or module, as can be utilized in the DFE of FIG. 2B, in accordance with exemplary embodiments.

FIG. 2C illustrates a block diagram of an exemplary symbol timing recovery loop (STRL) circuit or module, as can be utilized in the DFE 202 of FIG. 2A, in accordance with exemplary embodiments. For example, symbol timing recovery consists of several blocks that work together: (1) a timing (phase) error detector & loop-filter (e.g., the Phase Error Detector 256 and Loop Filter 258 of FIG. 2C), (2) an oscillator (e.g., the NCO 250 of FIG. 2C), (3) an interpolator (e.g., the asynchronous resampler 252 of FIG. 2C), (4) a sample dropper (e.g., the Sample Dropper 253 of FIG. 2C), and (5) an RRC filter (e.g., the Matched Filter 254 of FIG. 2C). It should be noted that the Interpolator 302 may comprise an asynchronous resampler. Accordingly, the BTR 238, for example, comprises the Phase Error Detector 256, the Loop Filter 258 and the numerically controlled oscillator (NCO) module 250. The NCO 250 is used as a time-keeper and is programmed with a frequency that represents the ratio between the incoming sampling-rate (2×-4×) and the outgoing sampling rate (2×). Each time the NCO 250 rolls-over (at a 2× rate), it generates a residual fractional time and a symbol-enable control. At each symbol-enable control, the residual fractional time is used by the Interpolator 252 to interpolate the input signal to generate one output sample. The Interpolator 252 uses FIR filters, such as from a Farrow structure, to perform the interpolation. The Sample Dropper 253 drops the undesired samples to achieve a sample rate of exactly 2× (e.g., 2 sps). The resampled 2× signal is matched-filtered by the Matched Filter 254 to generate the pulse-shaped the output samples. The symbol timing recovery loop 240, without the Phase Error Detector 256 and the Loop Filter 258, can be used to resample a signal from 2×-4× down to exactly 2×, but does not sample at the optimal points (peak & zero-crossing). And the Phase Error Detector 256 and the Loop Filter 258 can enable automatically moving to the optimal sampling points, for example.

The Phase Error Detector 256 uses a detector, such as a Gardner detector, to compute the phase error (effectively a timing error) present in the samples. The Loop Filter 258 is used to filter out any noise present the phase error estimate. The filtered phase error can be used to adjust the NCO phase to either move it forward in time or move it backward in time towards the correct optimal sampling point. The NCO 250 typically starts off blindly sampling at 2×. Over time, guided by the Phase Error Detector 256, the NCO 250 moves the sampling to the optimal sampling points. But the slowest clock that can be run by the symbol timing recovery loop 240 is at the input sampling rate (2×-4× of the symbol-rate), for example.

Figure 3A:
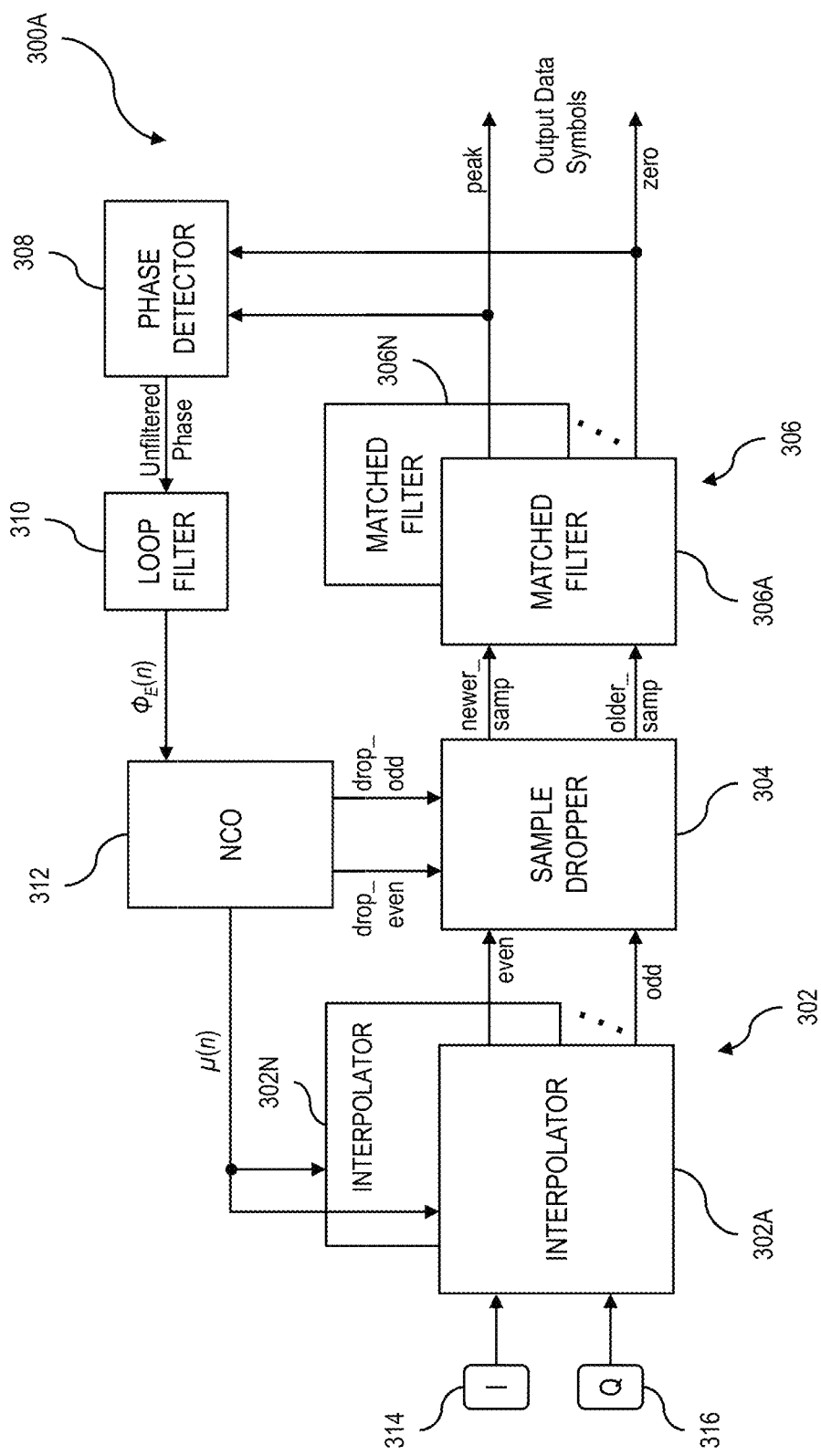
FIGS. 3A and 3B illustrate block diagrams of exemplary parallel structures for implementing symbol timing recovery loop circuits or modules, as can be utilized in the exemplary demodulator components of FIGS. 2A-2C, in accordance with exemplary embodiments.
Figure 3B:
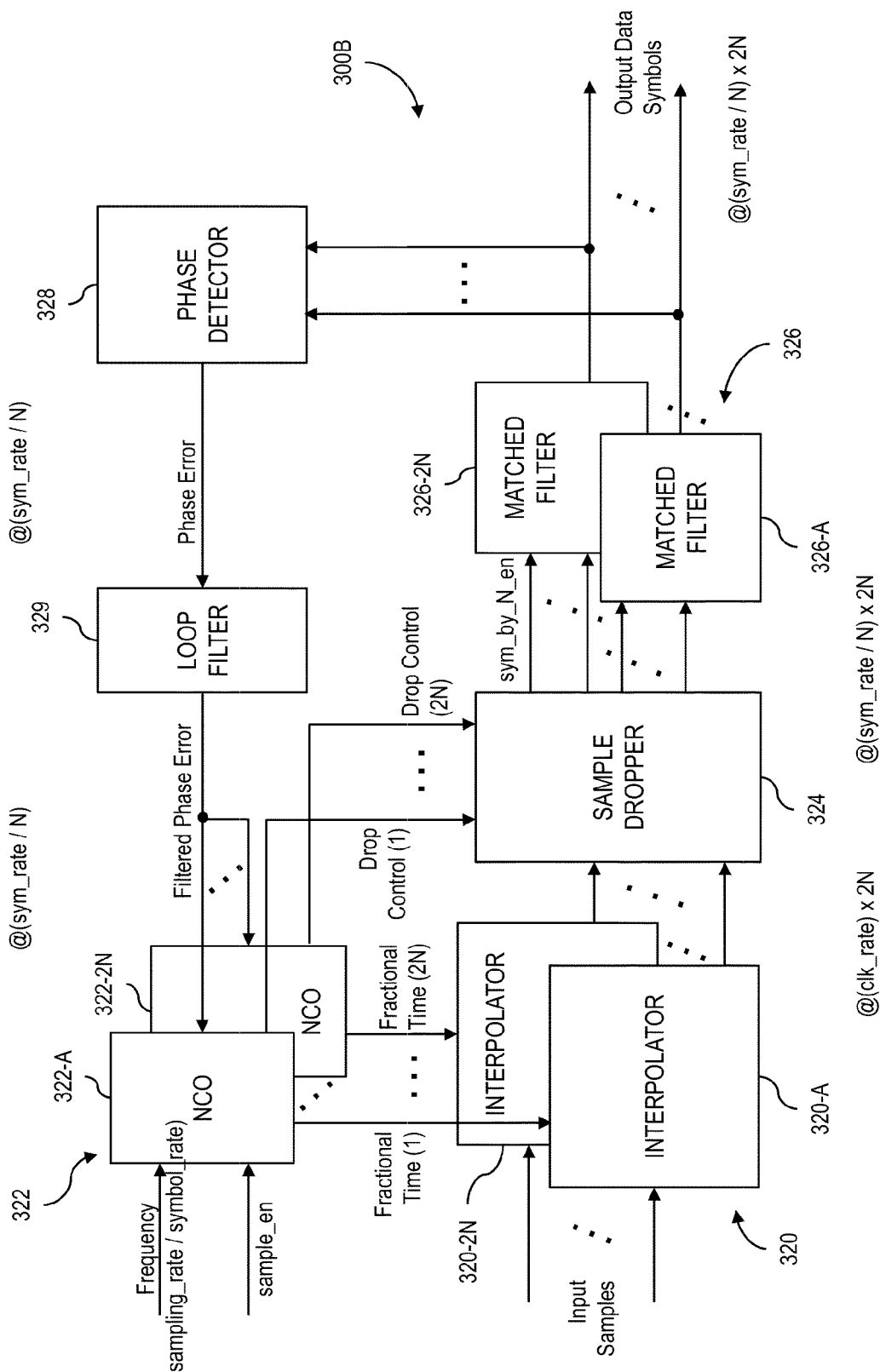
Figure 10:
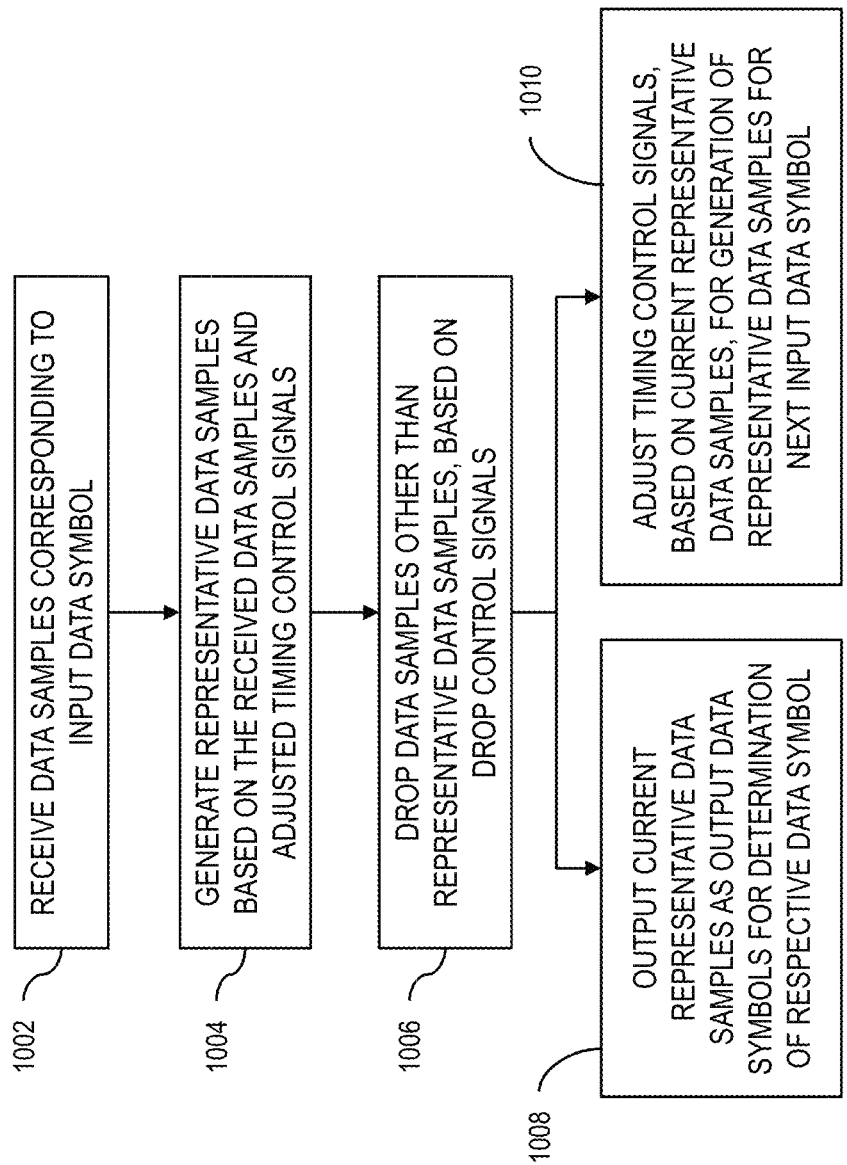
FIG. 10 illustrates a flow chart of an exemplary process of a symbol timing recovery loop, in accordance with exemplary embodiments.

FIGS. 3A and 3B illustrate block diagrams of exemplary parallel structures for implementing a symbol timing recovery loop circuit or module, as can be utilized in the exemplary demodulator components of FIGS. 2A-2C, in accordance with exemplary embodiments. With reference to FIG. 3A, similar to FIG. 2C, for example, the symbol timing recovery loop 300A comprises (with respect to FIG. 2B) the Asynchronous Resampler 232, RRC 234 and BTR 238, where the BTR 238, for example, comprises the Phase Error Detector 308, the Loop Filter 310 and NCO 312. Again, it should be noted that the Interpolator 302 may comprise an asynchronous resampler. Also, the various control signals, inputs, outputs and data processing flow in the symbol timing estimation loop 300A are further identified, illustrated and described in and with reference to FIGS. 3A and 3B, according to aspects of the invention. The exemplary block diagrams of FIGS. 3A and 3B, for example, may be utilized in the demodulator 200 of FIG. 2A, which will also be discussed with reference to FIG. 10. FIG. 10 illustrates a flow chart of an exemplary process of a symbol timing recovery loop, in accordance with exemplary embodiments.

In accordance with exemplary embodiments of such symbol timing recovery loops, an interpolator receives the I and Q data, and samples the data, for example, at a rate greater than 2× the data symbol rate. Two samples are taken corresponding to each data symbol (e.g., a peak and null sample), which are fed to a filter (e.g., an RRC filter or a matched filter) and a phase detector. The phase detector determines any phase error or information with respect to the data samples, and the phase error or information is filtered (e.g., a low pass or loop filter) to filter for noise and jitter. The filtered information is fed, for example, to a numerically controlled oscillator (NCO) or counter, which determines appropriate phase error corrections (which are fed to the interpolator) and drop control signals signifying appropriate data samples to be dropped (which are fed to a sample dropper). With regard to the drop control signals, the NCO counter tracks positioning of the samples with respect to the received data (based on the phase information), and determines the appropriate samples to drop based on that positioning. Accordingly, based on the drop control signals from the NCO, the sample dropper drops the appropriate samples to reduce the rate to exactly 2× the data symbol rate. Further, based on the phase correction information received from the NCO, the interpolator adjusts the data sampling to obtain determine timing for obtaining optimal data samples with respect to the data symbols.

With reference to FIG. 3A, the symbol timing recovery loop 300A illustrates an exemplary parallel processing loop within the CSM 204, which implements a symbol timing recovery loop that enhances the preservation of temporal dependency between neighboring samples of the received input data being processed in the demodulator, such as the demodulator 200 of FIG. 2A. In accordance with such exemplary embodiments, recovery at a substantially accurate symbol timing for a high symbol-rate signal, using a parallel architecture and a relatively low processing clock speed, can be used, particularly, when the input data is received in a continuous mode of signal data transmission, according to aspects of the invention. Such processing of high data-rate streams and high symbol-rates for symbol timing recovery at such lower clock speed enhances and promotes relatively efficient and economical signal processing, within current cost-efficient ASIC designs for demodulation.

In accordance with an exemplary embodiment, the symbol timing recovery process begins with the receipt of data samples received at, for example, the interpolator(s) 302 and 320 of FIGS. 3A and 3B, respectively. The data samples correspond to the data symbols of an input data stream, where the input data stream comprises a received data transmission, transmitted in a continuous mode or a burst mode of data transmission. In the case of an implementation, in accordance with an exemplary embodiment, where the input data symbols are processed in a parallel structure, the data samples are formatted into parallel feeds (e.g., by the DFE or by the CSM). Typically, the data signals received by the demodulator, can include several samples of data that are tucked, or grouped, together to represent a particular symbol of data.

With reference to FIG. 10, in accordance with an exemplary embodiment, with respect to the data samples corresponding to a current input data symbol, for example, the symbol timing recovery process begins at Step 1002, where the data samples corresponding to the input data symbol are received (e.g., by the Interpolator(s) 302 of FIG. 3A or the Interpolator(s) 320 of FIG. 3B). The process then proceeds to Step 1004, where the interpolator(s) generate representative data samples based on the received data samples and the adjusted timing control signals (described in further detail below), for example, received from the NCO (e.g., the μ(n) signal of FIG. 3A or the Fractional Time signals of FIG. 3B). At Step 1006, the data samples, other than the representative data samples, are dropped based on drop control signals (e.g., the drop control signals received from the NCO(s), as depicted in FIGS. 3A and 3B). In this regard, the Sample Dropper 304 based on the drop control signals, determines the samples to drop to get to the desired sampling rate (e.g., exactly 2 sps), according to aspects of the invention and thereby selects representative data samples for further processing.

At Step 1008, the representative data samples are output as the output data symbols for determination of the respective input data symbol. More specifically, for example, the matched filter(s) (e.g., 306) produces 2 samples per symbol. One of the two samples effectively reflects the symbol value, once the BTR converges or locks on the optimal representative sample generation timing. The other sample reflects the null between the symbols. The actual matching of the optimal representative sample values against the ideal symbol positions is performed by the CSM. Further, at Step 1010, the timing control signals are adjusted based on the representative data samples generated by the interpolator(s) and based on timing or phase error signals received by the NCO(s). In other words, based on the timing control signals, the interpolator(s) generate representative data samples based on the received data samples for the current input data symbol, and based on those representative data samples, the current input data symbol is extracted or determined. Further, pursuant to Steps 1002 and 1004, the data samples corresponding to a next input data symbol are received, and the interpolator(s) (e.g., the Interpolator(s) 302/320) generate the representative data samples for such data samples corresponding to the next input data symbol. At this point, however, the interpolator(s) generate the representative data samples based on the timing control signals, as adjusted per Step 1010, based on the representative data samples corresponding to the previous input data symbol. In that regard, in efforts to generate optimal representative data samples, corresponding to each input data symbol, the symbol timing recovery loop continually adjusts the generation of the representative data samples based on timing control signals (e.g., based on error control information) based on the representative data samples generated for the previous input data symbols.

Referring to FIG. 3A, for example, in processing the data samples corresponding to the received input data symbols, the NCO 312 maintains timing and is programmed with a certain determined or predetermined frequency that represents the ratio between the incoming sampling-rate and the outgoing sampling rate that corresponds to a certain number of samples per symbol of the input data for processing. Also, based upon the timing maintained by the NCO 312, the NCO 312 generates drop control signals for drop odd and drop even, for the parallel implementation, according to aspects of the invention, for example. The drop control signals generated by and from the NCO 312 are provided to the Sample Dropper 304, and enable dropping samples that are not selected as the representative samples for corresponding symbols, based upon the timing maintained by the NCO 312.

More specifically, in accordance with exemplary embodiments, the BTR 238 within the STRL 300A determines points in time for generation of the representative data samples. The BTR 238 (e.g., via the NCO 312) thereby generate timing control signals to enable locking or synchronizing the modulator with respect to determining a relatively optimum sample generation corresponding to a respective data symbol. The BTR 238 thereby determines timing signals for generation of the representative data samples. Moreover, the BTR 238 can also determine timing for a plurality of samples per symbol as optimal representative data samples for a corresponding symbol, although such determination is not typically as desirable as determining a single representative data sample per symbol, for example. Additionally, of the data samples being processed by the demodulator, such as the demodulator 200 of FIG. 2A, a best, optimal or ideal point needs to be determined for the data samples being processed for a sample to go out, not only for integer number samples for determining a representative data sample, but particularly where the relatively, ideal best or optimal data sample is between two samples, i.e. a fractional number samples for determining the representative sample, for example.

According to aspects of the invention, a timing control signal μ(n), which can be an integer number timing, or a fractional timing such as where the representative sample is between two samples, is determined by the BTR 238 generated by the NCO 312. The timing μ(n) from the NCO 312, as a timing control signal, is provided to the Interpolator 302. The Interpolator 302 receives and processes the timing information μ(n) and determines points for the interpolation of representative data samples (based on the timing information), which are either an integer data sample or are a fractional data sample in between two data samples for a corresponding symbol, as the generated data samples, and provides the representative data samples to the Sample Dropper 304. According to aspects of the invention, therefore the BTR 238, in determining points in time for generation of representative data samples, can select points in time where the representative data samples can correspond to an integer number, or a fractional number, to represent the samples in a symbol, such as where the number of samples in a symbol can be, for example, 3.4 or 4.2, so that on the average that is the number of samples corresponding to each symbol being processed.

Thus, according to aspects of the invention, in addition to processing samples having an exact integer number for the samples per symbol, the BTR 238 can advantageously process fractional samples per symbol, as well as integer number samples, to determine a sample that relatively best, optimally or ideally, represents a symbol of data for data processing. The representative data samples can therefore be optimal integer representative data samples or optimal fractional representative data samples, for example, as to determining a relatively best, optimal or ideal sample per symbol of data, according to aspects of the invention. Such fractional samples per symbol processing, in conjunction with processing signals in parallel or plural segments, according to aspects of the invention, can be particularly advantageous for processing data signals for high data-rate streams and high symbol-rates received in a continuous mode of data signal transmission to enable symbol timing recovery at lower clock speeds.

The BTR 238 generates error control or correction signals, which are provided to the Interpolator(s) 302. Based on the error control or correction signals, the Interpolator(s) 302 adjust the timing for the generation of the representative data samples. The Interpolator(s) 302 (based on the error control or correction signals provided by the NCO 312) generates the representative data samples for the next input data symbol to obtain a more optimal representative data sample for the respective data symbol. Such error control signals, for example, comprise the μ(n) signaling of FIG. 3A (fed by the NCO 312 to the Interpolator(s) 302, as depicted in FIG. 3A). The symbol timing recovery loop thereby continually adjusts the timing for the generation of the representative data samples until the symbol timing recovery loop and the Interpolator(s) 302 are effectively "locked" for generation of the optimal representative data samples. At that point, the error correction signaling is at minimal error levels whereby the timing is no longer adjusted (e.g., if or until any subsequent error correction signaling indicates a need to again adjust the sample timing of the Interpolator(s) 302.

Accordingly, the Sample Dropper 304, drops the data samples per symbol, other than the representative data samples, from further processing, based on the drop even or drop odd commands from the NCO 312. The data samples not dropped are provided by the Sample Dropper 304 to the Matched Filter 306 (e.g., a root-raised cosine (RRC) filter), which is typically a FIR filter that performs filtering. From the Matched Filter 306 the filtered data samples are provided to the Phase Detector 308 which compares two samples to determine phase error information that is provided to the Loop Filter 310. The phase error information is filtered by the Loop Filter 310 and provided back to the NCO 312 to adjust the timing of the timekeeper of the NCO 312, such as for generating the timing control signals and the drop control signals.

For example, the Phase Detector 308 in determining the phase error information provides a timing error detector that estimates the phase difference between the peak RRC sample and the zero-crossing RRC sample. The instantaneous phase errors are typically filtered using a first-order loop filter with programmable gain, such as the Loop Filter 310. The estimated phase (timing) error is typically used to modulate the NCO 312 which determines the resampling generation control signals for the representative sample generation. Typically, the resampling control signals provided by the NCO 312 include the timing information μ(n) for timing-controls corresponding to timing control signals for a parabolic interpolator of the Interpolator 302, and drop control signals corresponding to the sample drop control signals, drop even and drop odd, provided to the Sample Dropper 304. According to aspects of the invention, two sets of timing-controls and drop-controls are generated, one for each of the parallel samples, for example. Further, typically the signal processing, according to aspects of the invention, enables processing, using the described parallel structure, of 2N samples in each clock cycle, as indicted by the Interpolator 302 processing sections 302A-302N and the Matched Filter 306 filtering sections 306A-306N. Also, the various inputs, outputs, control signals and data processing flow in the symbol timing recovery loop 300A are further illustrated and described in and with reference to FIG. 3A, according to aspects of the invention.

The exemplary symbol timing estimation loop 300A of FIG. 3A thereby implements a symbol timing recovery loop for symbol timing recovery and generates data samples from which are generate at least one optimal representative data sample for each corresponding symbol of data from data samples per symbol for symbols of data in the received input data for data processing, and drops from further processing those of the data samples per symbol of data, other than the generated representative data samples, according to aspects of the invention.

In the symbol timing recovery loop 300A, various components have been essentially parallelized, according to aspects of the invention, to advantageously process data signals for high data-rate streams and high symbol-rates received in a continuous mode of data signal transmission to enable symbol timing recovery at lower clock speeds of current ASIC designs. While a traditional continuous modem can employ a sample dropper, such sample dropper is typically not parallelized in that there is only one sample coming in at a time for processing. Further, such traditional non-parallelized sample dropper does not function to process the drop even and drop odd control signals for representative sample selection. In contrast to such traditional continuous modem, the BTR 238 and the NCO 312, according to aspects of the invention, generate two new phases for each clock and, based on such generation, determine a drop control for the even part and the odd part of the parallelized signals to be processed, whereas in the traditional continuous modem typically it is needed to only generate one phase for each clock, for example.

The parallelized components for parallel processing of the input data signals include the Interpolator 302, the NCO 312 and the Sample Dropper 304 in that, according to aspects of the invention, two data samples come in together at a time to the demodulator, such as demodulator 200, for processing, rather than one data sample at a time as in known demodulation systems. Also, while the Matched Filter 306 is parallelized, according to aspects of the invention, a generic parallel FIR filter can be used for the Matched Filter 306, for example. The Phase Detector 308 and the Loop Filter 310 can also be parallelized, dependent on the timing and number of signals received. But formatting the input data into a plurality of data segments greater than two for processing, such as four data segments, more likely can require parallelization or multiple parallelizations for the respective components of the DFE 200A and the symbol timing estimation loop 300A implementing the symbol timing recovery loop 300B, according to aspects of the invention, the tradeoff typically being between complexity versus speed and efficiency, for example.

Similarly, referring again to FIG. 3B, according to exemplary embodiments, (as in FIG. 2C, for example), the symbol timing recovery loop 300B comprises (with respect to FIG. 2B) the Asynchronous Resampler 232, RRC 234 and BTR 238, where the BTR 238, for example, comprises the Phase Error Detector 328, the Loop Filter 329 and NCO(s) 322. Again, it should be noted that the Interpolator 302 may comprise an asynchronous resampler. The signal processing in the demodulator, such as demodulator 200, is typically done using a parallel structure where 2N samples are processed in each clock cycle, for example. A numerically controlled oscillator (NCO) module 322 (e.g., comprising a parallel configuration of 2N NCO circuits 322-A to 322-2N), as a timing circuit, is used as a time-keeper and is programmed with a frequency that represents the ratio between the incoming sampling-rate and the outgoing sampling rate and, therefore, determines a number of samples per symbol of the input data for processing. Each time the NCO 322, as a timing circuit, rolls-over, it generates residual fractional times, or generates integer times, as timing control signals, for example.

As discussed in relation to the NCO 312 of FIG. 3A, the timing control signals, generated by the NCO 322 of FIG. 3B, are provided to the Interpolator 320 (e.g., a resampler or asynchronous resampler), for generating representative data samples for each corresponding symbol of data from data samples per symbol of data for symbols of data in the received input data. (FIG. 10, Steps 1002, 1004). However, according to aspects of the invention, the NCO 322 includes, for example, 2N parallel phase accumulators 322-A-322-2N. At each sample, for example, the 2N accumulators 322-A-322-2N advance by the frequency step and generate 2N fractional times, as well as 2N drop controls, for example. At each clock, an Interpolator 320, such as by using 2N parallel interpolators 320-A-320-2N, for example, generates 2N interpolated samples for the input data samples using the 2N fractional times, or integer times, provided by the NCO 322, for example. The 2N fractional times, or integer times, generated by the NCO 322 are used by the Interpolator 320 to interpolate the input signals to generate the output generated data samples for determining the representative data samples (FIG. 10, Step 1004).

A sample dropper module (e.g., the Sample Dropper 324) of FIG. 3B determines which of the data samples received from the Interpolator 320 need to be dropped and drops the samples per symbol from further processing, other than the representative data samples, based on the drop control signals for the NCO 322 (FIG. 10, Step 1006). When 2N samples are ready to be output from the Sample Dropper 324, the 2N samples are sent out of the Sample Dropper 324 along with a "sym_rate_by_N_en" control signal. The sym_rate_by_N_en control signal generated by the Sample Dropper 304 is used to crank, or drive, substantially all downstream processing in the demodulator, such as demodulator 200, according to aspects of the invention.

The output from the Sample Dropper 324 is provided to a Matched Filter module 326 (e.g., an RRC filter. The Matched Filter 326 is typically a parallel FIR filter that runs at the speed of (symbol-rate/N), for example. The Matched Filter 326 typically has 2N parallel FIR filters, 326-A-326-2N and generates 2N parallel outputs, for example, the outputs including the selected representative data samples output from the Sample Dropper 324 and filters the selected representative data samples from the sample dropper circuit to provide matched filtered data samples for corresponding symbols of data for processing.

An exemplary Phase Detector 328 in FIG. 3B uses a detector, such as a Gardner detector, to compute the phase error (effectively a timing error) present in the filtered data samples, and determines phase errors corresponding to timing errors in processing the data samples for corresponding symbols of data. The Phase Detector 328 takes all 2N parallel samples received from the Matched Filter 326 and generates N distinct phase error estimates, or phase errors, for example. These N phase errors generated by the Phase Detector 328 are added up (averaged) to typically generate typically a single phase error estimate, for example.

The exemplary Loop Filter 329 of FIG. 3B can be used to filter out any noise present in the phase error estimate received from the Phase Detector 328, thereby filtering the phase errors to adjust the timing to the points in time for selection of optimal representative data samples. The Loop Filter 329 filters the determined phase errors from Phase Detector 328 and generates the filtered phase errors to adjust the timing control signals and the drop control signals of the timing circuit, such as the NCO 322. The instantaneous phase errors are typically filtered using a first-order loop filter with programmable gain by the Loop Filter 329.

The filtered phase error can be used to adjust the NCO phase to either move it forward in time or move it backward in time towards the correct sampling point or points, thereby filtering the determined phase errors from Phase Detector 328 and for generating filtered phase errors to adjust the timing control signals and the drop control signals generated by the NCO 322, the timing circuit, to determine the points in time for selection of optimal representative data samples. The loop filter structure for the Loop Filter 329 can be similar to that used for a serial architecture, for example. However, in contrast, according to aspects of the invention, in the case of a parallelized processing format, the Loop Filter 329 typically runs at the rate of (symbol-rate/N), where the "symbol rate" corresponds to the symbol rate for the received data and "N" corresponds to a number of symbols for further processing; and typically the same filtered phase error is used to adjust all 2N phase accumulators, 322-A-322-N, in the NCO 322, according to aspects of the invention, for example.

In the parallel symbol timing recovery loop 300B, a worst-case scenario can occur when the Phase Detector 328 and the Loop Filter 329 are running at the full clock-speed. However, utilizing the exemplary symbol timing recovery loop 300B, according to aspects of the invention, real-time continuous symbol timing recovery can be performed using a clock that is N times slower than the symbol-rate to advantageously process data signals for high data-rate streams and high symbol-rates received in a continuous mode of data signal transmission to enable symbol timing recovery at lower clock speeds of current ASIC designs.

Figure 4:
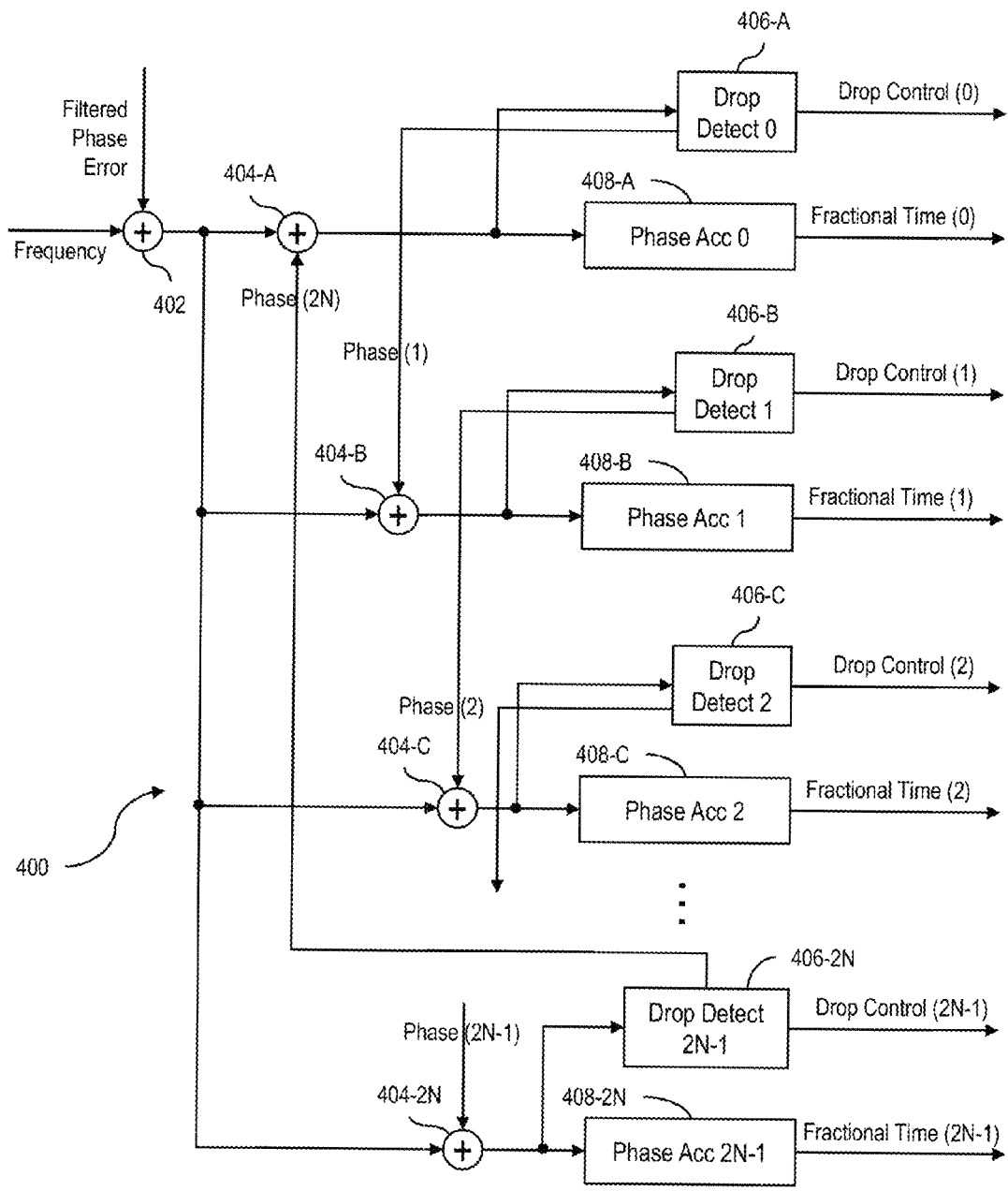
FIG. 4 illustrates a block diagram of an exemplary parallel structure for a timing module, as can be utilized for an exemplary NCO of FIGS. 3A and 3B, in accordance with exemplary embodiments.

FIG. 4 illustrates a block diagram of an exemplary parallel structure for a timing module, as can be utilized for an exemplary NCO of FIGS. 3A and 3B, in accordance with exemplary embodiments. Also, the various control signals, inputs, outputs and processing flow in the parallel NCO structure 400 are further identified, illustrated and described in and with reference to FIG. 4, according to aspects of the invention.

The Parallel NCO structure 400 includes 2N Phase Accumulators 408-A-408-2N that are updated at the input sampling rate. Each time the NCO 322 rolls-over, it typically generates residual fractional times and integer times and control signals. The fractional times generated by the Phase Accumulators 408-A-408-2N correspond to the fractional times 0-2N–1. The filtered phase errors and frequency are received at a summing node 402 and are provided to phase summing nodes 404-A-404-2N that provide inputs to the respective Phase Accumulators 408-A-408-2N and are also provided to the respective Drop Detectors 406-A-406-2N. At each sample, for example, the 2N Phase Accumulators 408-A-408-2N advance by the frequency step and generate the 2N fractional times provided to the Interpolator 320, and the Drop Detectors 406-A-406-2N generate the 2N drop controls provided to the Sample Dropper 324, for example. Typically, a sample needs to be dropped if an update to the parallel NCO 400 structure does not cause the new phase to cross the half-symbol point. This is detected using the two top bits of the NCO. The remaining bits represent the additional time beyond the current sample at which the new interpolated sample needs to be computed. This typically is the fractional time that is sent to the Interpolator 320.

Figure 5:
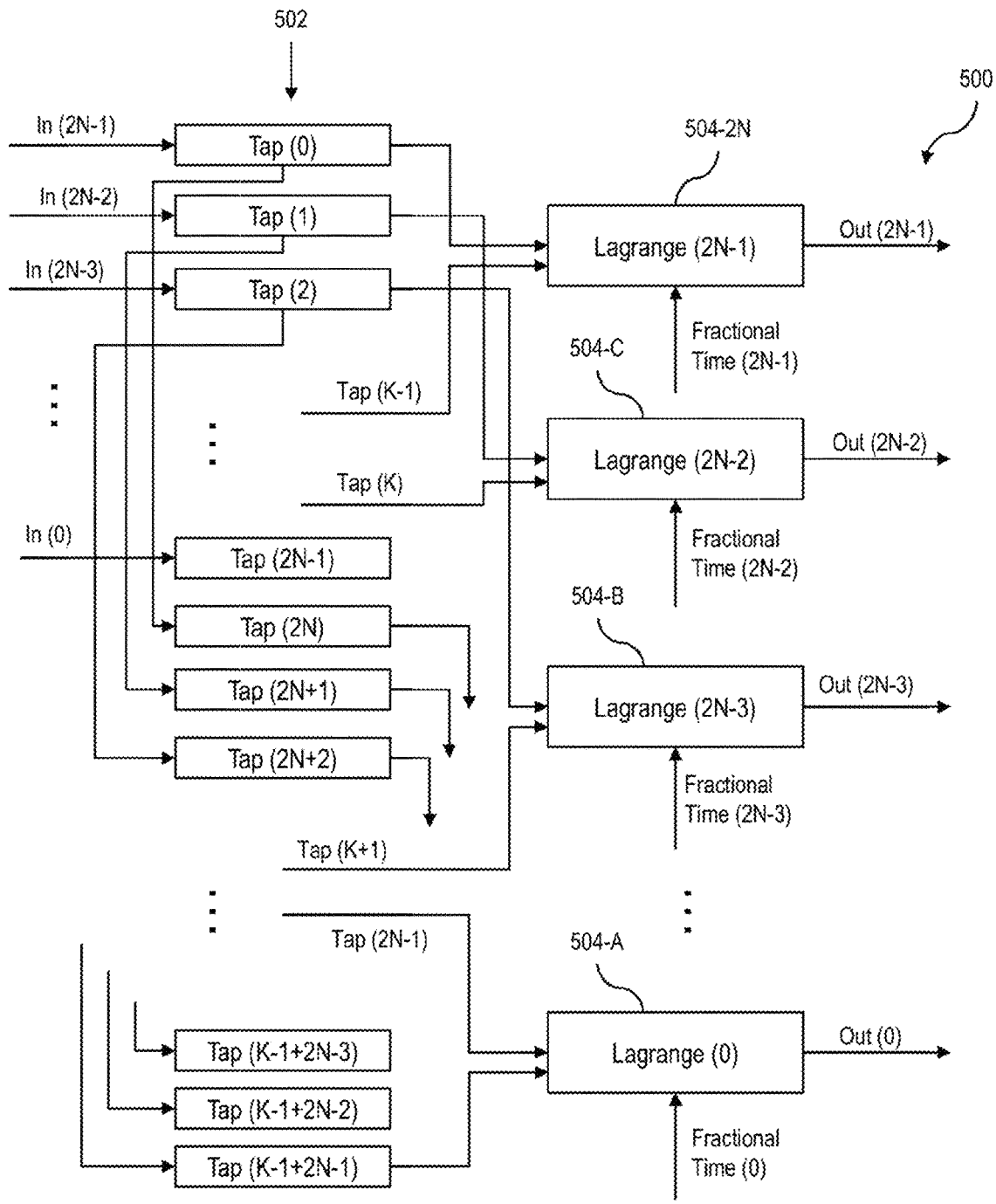
FIG. 5 illustrates a schematic diagram of an exemplary Lagrange Fractional Interpolator, as can be utilized for an exemplary Interpolator of FIGS. 3A and 3B, in accordance with exemplary embodiments.

FIG. 5 illustrates a diagram of an exemplary Lagrange Fractional Interpolator, as can be utilized for an exemplary Interpolator of FIGS. 3A and 3B, in accordance with exemplary embodiments. Also, the various inputs, outputs, control signals and data processing flow in the Lagrange Fractional Interpolator 500 are further illustrated and described in and with reference to FIG. 5, according to aspects of the invention. Referring to FIG. 5, the exemplary parallel Lagrange Fractional Interpolator 500 has a parallel structure that includes a tapped-delay line 502 into which 2N parallel samples are loaded simultaneously. The tapped-delay line 502 is moved forward by 2N samples for each compute operation. In the Lagrange Fractional Interpolator 500, 2N of the parallel Lagrange Fractional Interpolators 504-A-504-2N are instantiated. Each Lagrange Fractional Interpolator, 504-A-504-2N, typically has a Farrow structure that consists of K fixed FIR filters, each of order K, with K being the order of the Lagrange interpolation. Each of the Lagrange Fractional Interpolators 504-A-504-2N takes a different set of K taps as the input samples, a fractional time as the domain variable for the polynomials, and typically generates a single output sample, for example, according to aspects of the invention.

Figure 6A:
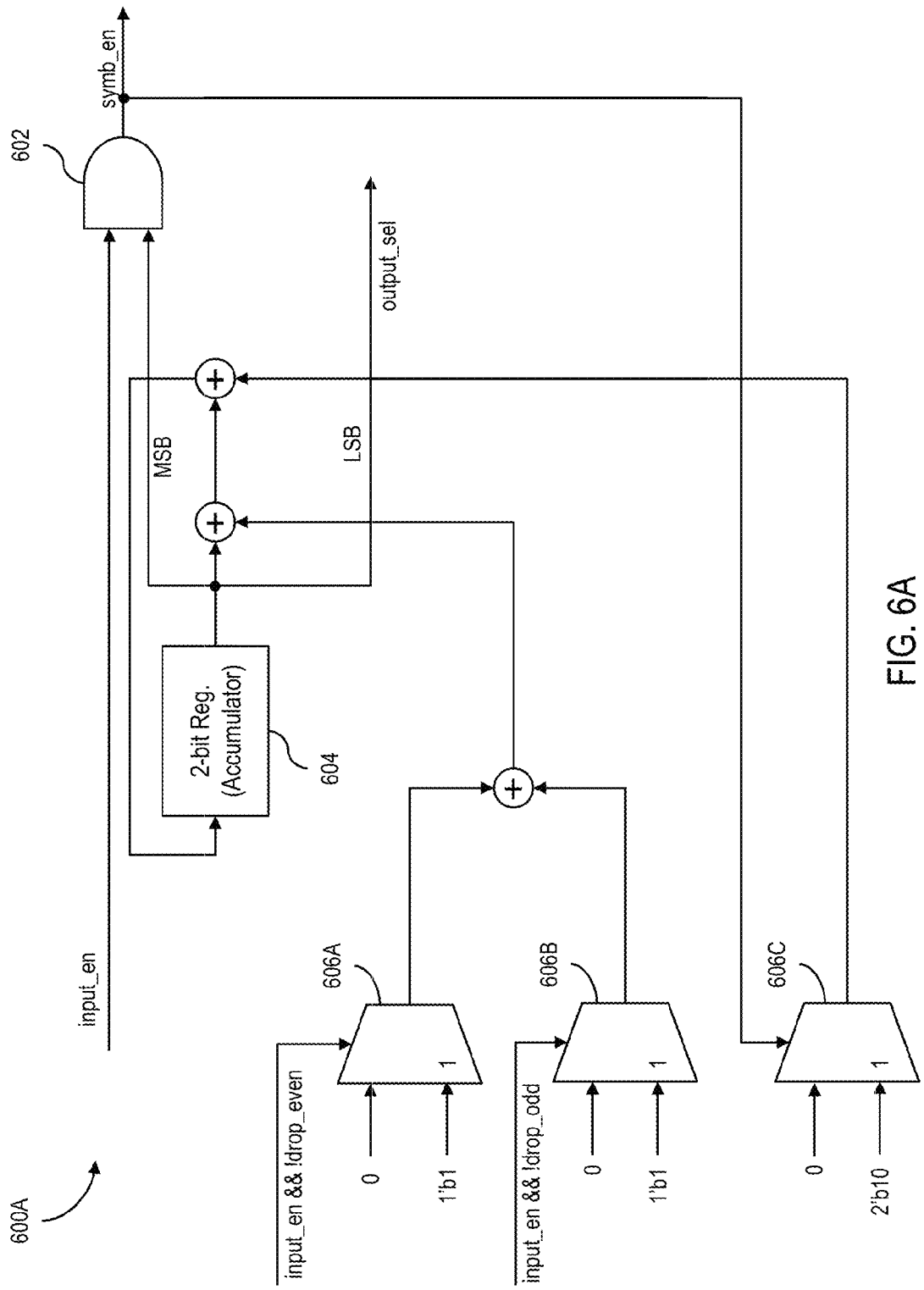
FIG. 6A illustrates a diagram of an exemplary sample-dropper controller, as can be utilized with the Sample Dropper of FIGS. 3A and 3B, in accordance with exemplary embodiments.
Figure 6B:
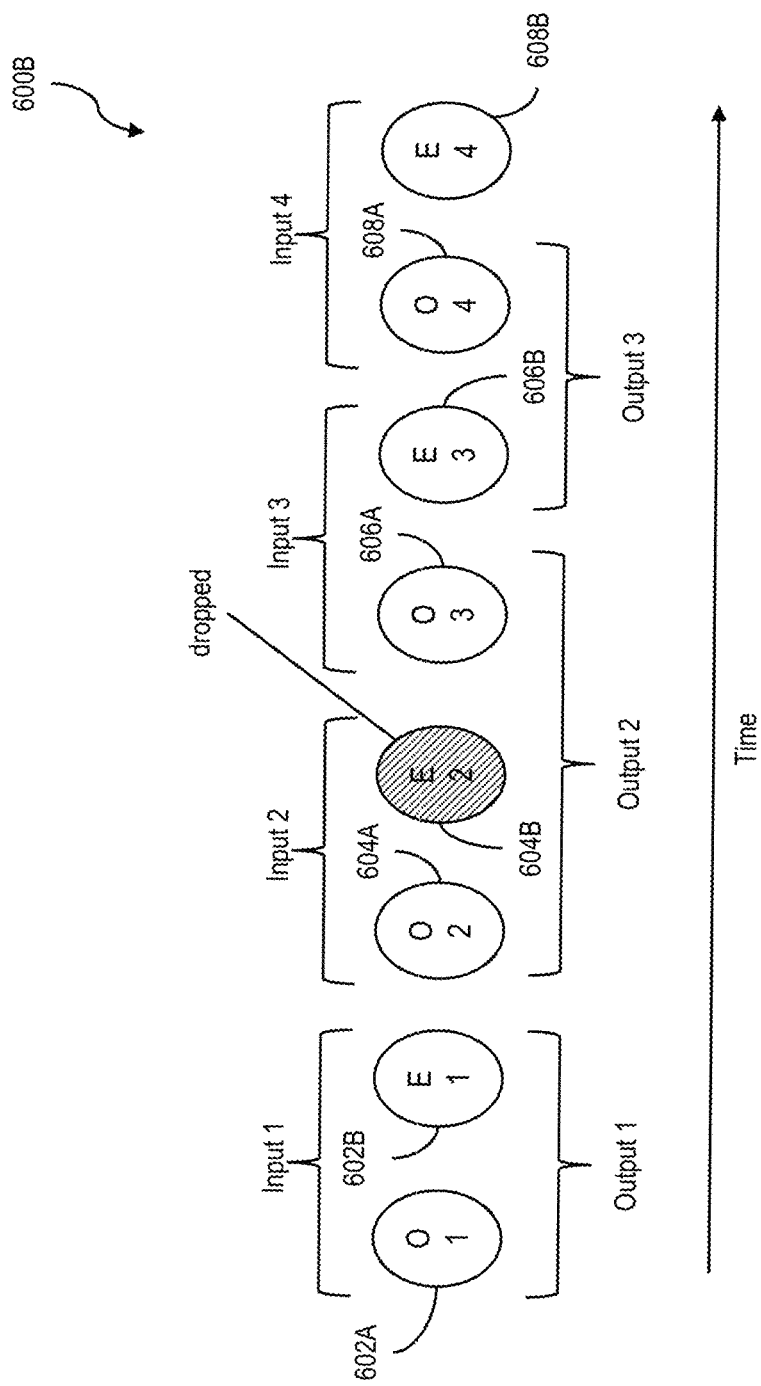
FIG. 6B illustrates a diagram of an example operation of the Sample Dropper of FIGS. 3A and 3B, in accordance with exemplary embodiments.
Figure 7:
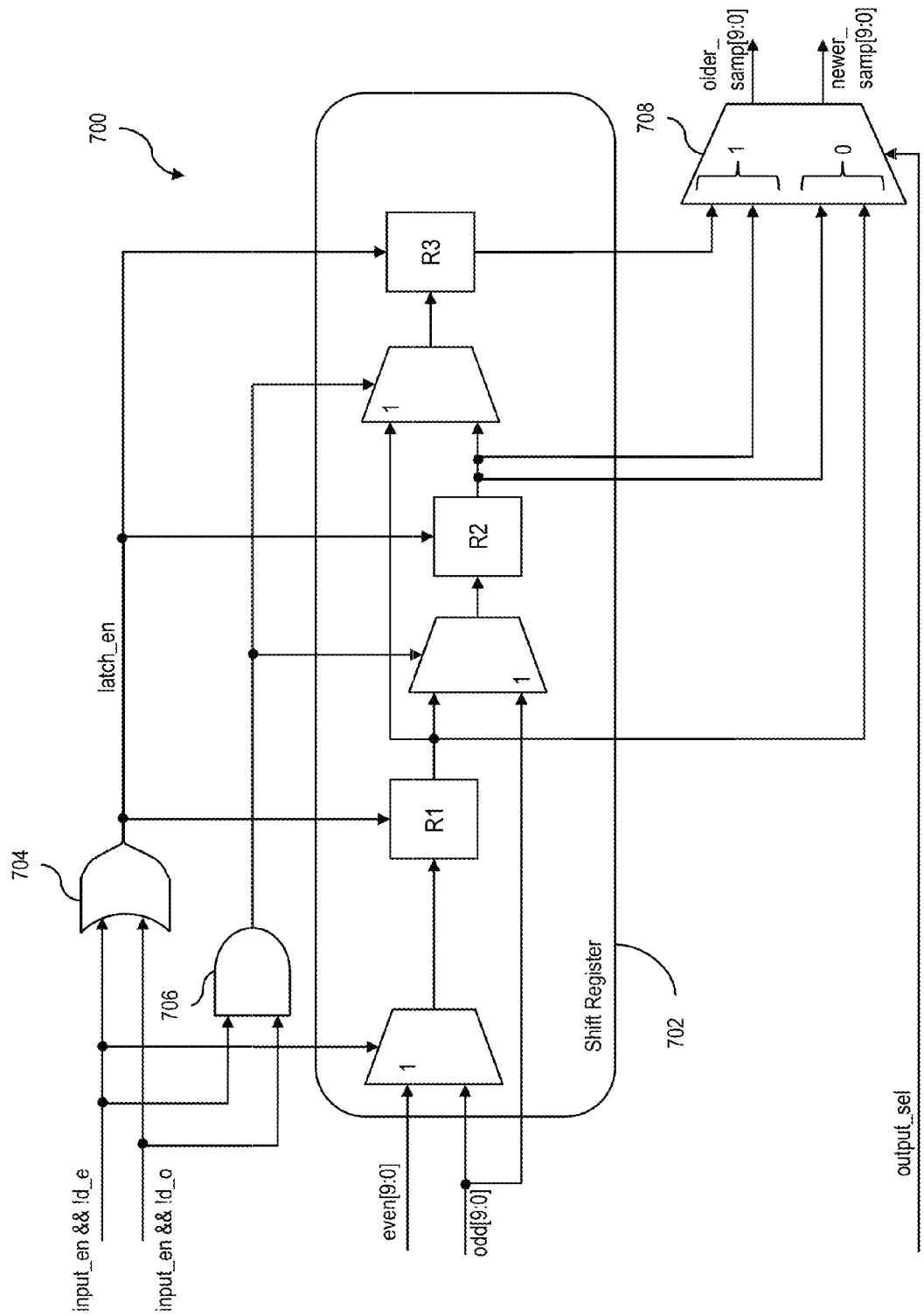
FIG. 7 illustrates a diagram of an exemplary sample-dropper shift register, as can be utilized in the Sample Dropper of FIGS. 3A and 3B, in accordance with exemplary embodiments.

Referring now to FIGS. 6A, 6B and 7, FIG. 6A illustrates a diagram of an exemplary sample-dropper controller, as can be utilized with the Sample Dropper of FIGS. 3A and 3B, in accordance with exemplary embodiments, FIG. 6B illustrates a diagram of an example operation of the Sample Dropper of FIGS. 3A and 3B, in accordance with exemplary embodiments, and FIG. 7 illustrates a diagram of an exemplary sample-dropper shift register, as can be utilized in the Sample Dropper of FIGS. 3A and 3B, in accordance with exemplary embodiments. Also, the various control signals, inputs, outputs and data processing flow in the Sample-Dropper Controller 600A, the parallel sample-dropper operation 600B, and the Sample-Dropper Shift Register 700 are further identified, illustrated and described in and with reference to FIGS. 6A, 6B and 7, respectively, according to aspects of the invention.

Referring now to the FIGS. 6A and 7, the Sample-Dropper Controller 600A (FIG. 6A) and Sample Dropper Shift Register 700 (FIG. 7) perform the function of removing any samples from the data stream that need to be dropped according to the NCO 322, or the NCO 312, and then re-aligning the samples in order. FIG. 6A and FIG. 7 show an example implementation of the sample-dropper logic for the case of N=1. In addition, the Sample Dropper Controller 600A generates and outputs, such as from the output node 602, the enable-control (symb_en) for the (sym_rate/N) processing that takes place, such as in the demodulator 200, after the Sample Dropper 324. The Sample Dropper Controller 600A accepts 2N samples in parallel, such as at receiving nodes 606A-606C, at the input sampling rate and loads them into a Shift-Register 700, 702 that is (2×2N–1) deep, thereby arranging the output data samples corresponding to the representative data samples for further processing. The samples are loaded, such as at input nodes 704, 706 at the back of the line of any existing samples in the Shift-Register 700, 702.

Also, any samples that need to be dropped are not loaded into the Shift-Register 700, 702. A counter, such as Accumulator 604, in the Sample Dropper Controller 600A keeps count of the number of samples remaining in the Shift-Register 700, 702. Typically, the counter needs to be able to count from 0 to (2×2N–1). When the number of samples remaining in the Shift-Register 700, 702 equals or exceeds 2N, then the oldest 2N samples are popped out of the Shift-Register 700, 702 at output node 708 from the front and the remaining samples are moved to the front. The 2N popped samples are sent out at the output node 708 as the output of the Sample Dropper 324, as well as the "sym_rate_by_N_en" control signal is also output by the Sample Dropper 324, for example.

Referring to FIG. 6B, an example of a parallel sample-dropper operation 600B is illustrated, as can be implemented (for example) in the Sample Dropper 324 of FIG. 3B or in the Sample Dropper 304 of FIG. 3A. In FIG. 6B, odd (O) and Even (E) input data samples are data samples 602A and 602B as input1, data samples 604A and 604B as input2, data samples 606A and 606B as input3 and data samples 608A and 608B as input 4 are input to the Sample Dropper 304 or 324 over a time period indicated by the arrowed line "time" in FIG. 6B. In the exemplary case of FIG. 6B, data sample 604B is to be dropped and, therefore, as discussed, data sample 604B is not loaded into the shift register 700, 702 of FIG. 7 for further processing. The Sample Dropper 304 or 324 then organizes the remaining, not dropped data samples for further processing. In the exemplary parallel sample-dropper operation 600B, remaining data samples 602A and 602B are arranged as output1, remaining data samples 604A and 606A are arranged as output2, and remaining data samples 606B and 608A are arranged as output3, with remaining data sample 608B to be grouped or dropped, based upon further processing.

Figure 8:
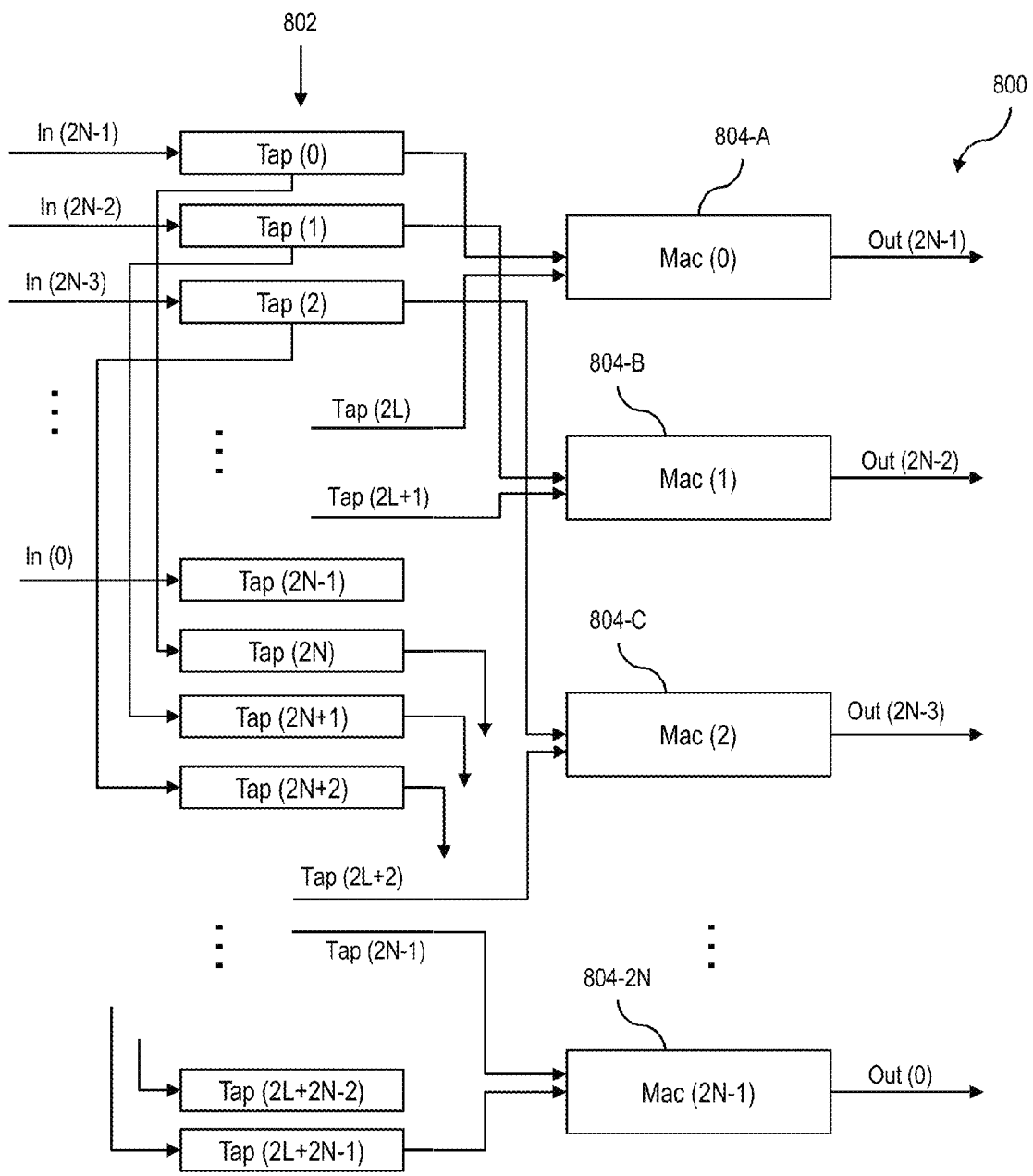
FIG. 8 illustrates a diagram of an exemplary filter structure, as can be utilized for the Filter of FIGS. 3A and 3B, in accordance with exemplary embodiments.

FIG. 8 illustrates a diagram of an exemplary filter structure, as can be utilized for the Filter of FIGS. 3A and 3B, in accordance with exemplary embodiments. Also, the various control signals, inputs, outputs and data processing flow in the exemplary Parallel Matched Filter structure 800 are further illustrated and described in and with reference to FIG. 8, according to aspects of the invention.

The Parallel Matched Filter structure 800 of FIG. 8 illustrates a parallel structure for a FIR matched filter which can be implemented by a general-purpose FIR filter with coefficients that can either be programmable or be fixed. However, if the parallel matched filter is to cover L symbols, the order of the Parallel Matched Filter structure 800 is typically on the order of (2L+1), according to aspects of the invention, for example, in that the filter typically is running at two times the symbol-rate. For a Parallel Matched Filter structure 800 including a parallel FIR filter with 2N parallel inputs and outputs, for example, according to aspects of the invention, the length of the tapped-delay line 802 typically will be (2L+1+2N−1)= (2L+2N), for example. The Tapped-Delay Line 802 is shifted by 2N for each compute operation. Also, in the Parallel Matched Filter structure 800 there are 2N parallel multiply-accumulate (MAC) units, 804-A-804-2N that simultaneously compute the 2N outputs from the tapped-delay line 802, as shown in FIG. 8, for example.

Figure 9:
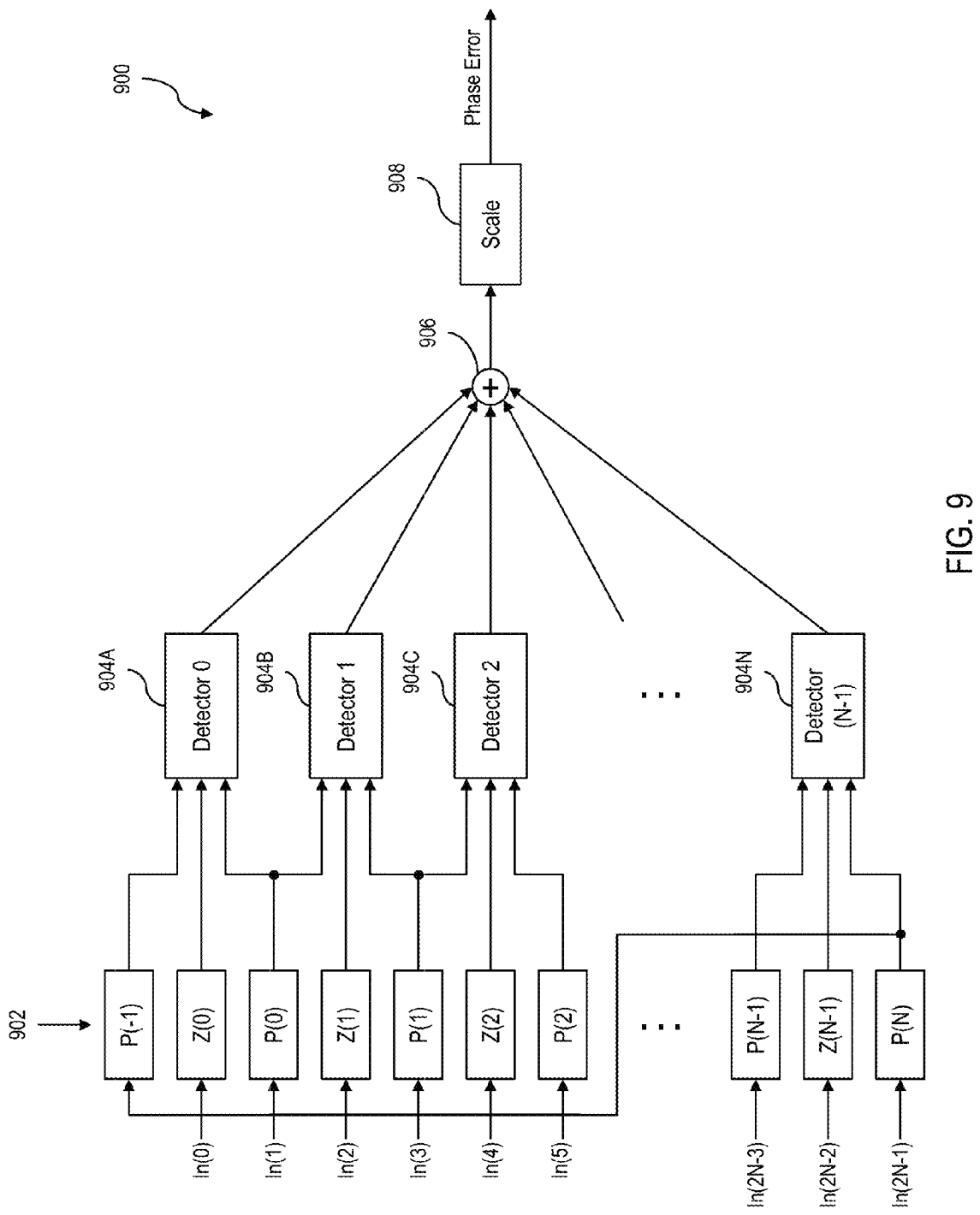
FIG. 9 illustrates a diagram of an exemplary phase error computation, as can be utilized in the Phase Detector of FIGS. 3A and 3B, in accordance with exemplary embodiments.

FIG. 9 illustrates a diagram of an exemplary phase error computation, as can be utilized in the Phase Detector of FIGS. 3A and 3B, in accordance with exemplary embodiments. Also, the various control signals, inputs, outputs and data processing flow in the Phase Error Computation structure 900 are further illustrated and described in and with reference to FIG. 9, according to aspects of the invention.

FIG. 9 illustrates an exemplary parallel Phase Error Computation Detector structure 900 to compute the average phase error present in 2N parallel samples (N parallel symbols) coming out of the Matched Filter 326, according to aspects of the invention, for example. The first input in the parallel sequence is assumed to be the earliest zero-crossing sample and the last input in the parallel sequence is assumed to be the latest peak sample. The previous value of the latest peak sample is saved to be used in the current phase detection. The phase error for each symbol is computed using the previous peak sample, current zero-crossing sample and the current peak sample received by the P, Z operators 902, such as for determining axis rotation and phase flip. The phase error determination is typically done in parallel by the parallel Phase Error Computation Detector structure 900 for N symbols, for example.

The phase error from each of the N symbols detected by the Detectors 904A-904N are added up by the combining node 906 and scaled by the Scale 908 to compute an average phase error from the N symbols. The average phase error determined by the Scale 908 is output from the parallel Phase Error Computation Detector structure 900 of the Phase Error Detector 328 and is provided to the Loop Filter 329. The Loop Filter 329 typically can remain substantially unchanged from that of a traditional symbol timing recovery loop. However, according to aspects of the invention, a difference, from that of a traditional symbol timing recovery loop, is that the Loop Filter 329 loop-filter runs at a speed of symbol-rate/N for processing the data samples in a parallelized format, for example.

As evident from the discussion as to the exemplary structure and circuitry of FIGS. 2-9 above, and as to the Demodulator 200 of FIG. 2A, the DFE 220 of FIG. 2B, the Symbol Timing Estimation Loop 300A of FIG. 3A, and the Symbol Timing Recovery Loop 300B of FIG. 3B, the various general designs and general functions of the modules and circuitry therein illustrated or described, include those typically as would be known to one of skill in the art.

However, as to the additional novel features, functions, elements and aspects of the invention described and illustrated in the exemplary embodiments herein with respect to FIGS. 2-9 and with respect to the DVB-S2 type Demodulator 200 of FIG. 2A, the DFE 220 of FIG. 2B, the Symbol Timing Estimation Loop 300A of FIG. 3A, and the Symbol Timing Recovery Loop 300B of FIG. 3B, that are not generally known to one of skill in the art, such novel aspects of the invention can be implemented with the knowledge and guidance of the disclosure herein, in view of generally known designs and functions of the modules and circuitry illustrated or described, such as those for DVB-S2 type demodulators.

Figure 11:
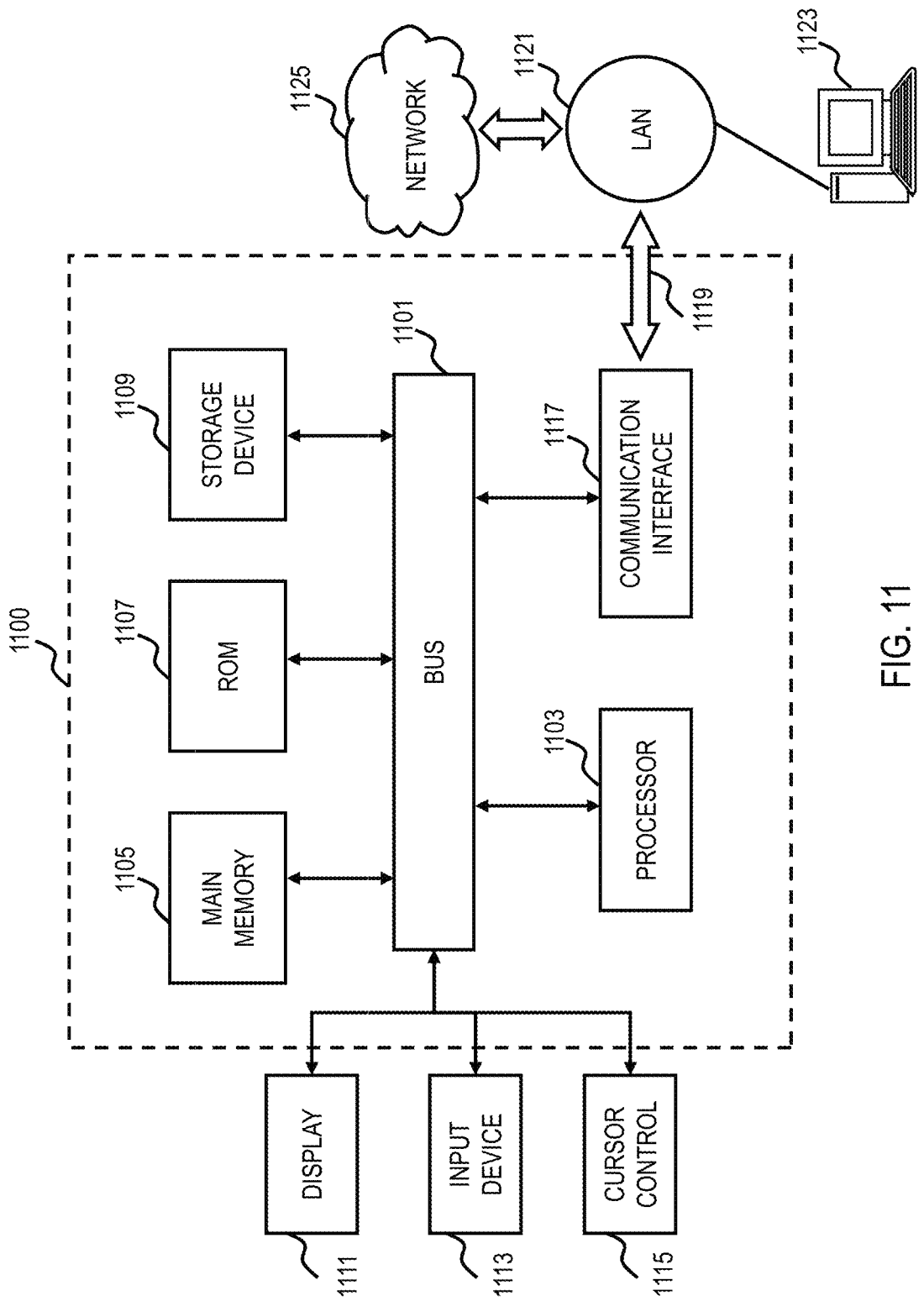
FIG. 11 illustrates an exemplary computer or control system for implementing architectures and methods for demodulation of high data-rate streams, with high symbol-rates, for symbol timing recovery, in accordance with exemplary embodiments.

FIG. 11 illustrates a computer system upon which exemplary embodiments according to the present disclosure can be utilized in implementing architectures and methods for demodulation high data-rate streams with high symbol-rates, such as for a symbol timing recovery loop for optimal representative data sampling in demodulation of received data signals in a continuous mode or a burst mode of data transmission, such as for DVB-S2 high data-rate streams with high symbol-rates for symbol timing recovery, in accordance with exemplary embodiments and aspects of the invention.

The computer system 1100 includes a bus 1101 or other communications mechanism for communicating information, and a processor 1103 coupled to the bus 1101 for processing information. The computer system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions to be executed by the processor 1103. The computer system 1100 further includes a read only memory (ROM) 1107 or other static storage device coupled to the bus 1101 for storing static information and instructions for the processor 1103. A storage device 1109, such as a magnetic disk or optical disk, is additionally coupled to the bus 1101 for storing information and instructions.

The computer system 1100 can be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is cursor control 1115, such as a mouse, a trackball, or cursor direction keys for communicating direction information and command selections to the processor 1103 and for controlling cursor movement on the display 1111.

According to one embodiment of the invention, dynamic and flexible architectures and methods for demodulation of input data including a symbol recovery loop for representative sample selection and timing in demodulation of received data signals in a continuous mode or a burst mode of data transmission, in accordance with exemplary embodiments and aspects of the invention, are provided by the computer system 1100 in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement can also be employed to execute the instructions contained in main memory 1105. In alternative embodiments, hard-wired circuitry can be used in place of or in combination with software instructions to implement embodiments and aspects of the invention. Thus, embodiments of the present invention are not limited to any specific combination of hardware circuitry and software.

The computer system 1100 also includes a communications interface 1117 coupled to bus 1101. The communications interface 1117 provides a two-way data communications coupling to a network link 1119 connected to a local network 1121. For example, the communications interface 1117 can be a digital subscriber line (DSL) card or modem, an integrated services digital network (ISDN) card, a cable modem, or a telephone modem to provide a data communications connection to a corresponding type of telephone line. As another example, communications interface 1117 can be a local area network (LAN) card (e.g. for Ethernet™ or an Asynchronous Transfer Model (ATM) network) to provide a data communications connection to a compatible LAN. Wireless links can also be implemented. In any such implementation, communications interface 1117 sends and receives electrical, electromagnetic, or optical signals that carry digital data streams representing various types of information. Further, the communications interface 1117 can include peripheral interface devices, such as a Universal Serial Bus (USB) interface, a PCMCIA (Personal Computer Memory Card International Association) interface, etc.

The network link 1119 typically provides data communications through one or more networks to other data devices. For example, the network link 1119 can provide a connection through local network 1121 to a host computer 1123, which has connectivity to a network 1125 (e.g. a wide area network (WAN) or the global packet data communications network now commonly referred to as the "Internet") or to data equipment operated by service provider. The local network 1121 and network 1125 both use electrical, electromagnetic, or optical signals to convey information and instructions. The signals through the various networks and the signals on network link 1119 and through communications interface 1117, which communicate digital data with computer system 1100, are exemplary forms of carrier waves bearing the information and instructions.

The computer system 1100 can send messages and receive data, including program code, through the network(s), network link 1119, and communications interface 1117. In the Internet example, a server (not shown) might transmit requested code belonging to an application program for implementing embodiments and aspects of the invention through the network 1125, local network 1121 and communications interface 1117. The processor 1103 can execute the transmitted code while being received and/or store the code in storage device 1109, or other non-volatile storage for later execution. In this manner, computer system 1100 can obtain application code in the form of a carrier wave.

The term "computer-readable medium" as used herein refers to any medium that participates in providing instructions to the processor 1103 for execution. Such a medium can take many forms, including but not limited to non-volatile media, volatile media, and transmission media. Non-volatile media include, for example, optical or magnetic disks, such as storage device 1109. Volatile media include dynamic memory, such as main memory 1105. Transmission media include coaxial cables, copper wire and fiber optics, including the wires that comprise bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media can be involved in providing instructions to a processor for execution. For example, the instructions for carrying out at least part of the present invention can initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 12 illustrates a diagram of a chip set that can be utilized in implementing architectures and methods for demodulation of high data-rate streams with high symbol-rates, such as for a symbol timing recovery loop for optimal representative data sampling in demodulation of received data signals in a continuous mode or a burst mode of data transmission, such as for DVB-S2 high data-rate streams with high symbol-rates for symbol timing recovery, in accordance with exemplary embodiments and aspects of the invention.

FIG. 12 illustrates a chip set 1200 in which embodiments and aspects of the invention can be implemented. Chip set 1200 includes, for instance, processor and memory components described with respect to FIG. 12 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1200 includes a communications mechanism such as a bus 1201 for passing information among the components of the chip set 1200 and to and from outside of the chip set 1200. A processor 1203 has connectivity to the bus 1201 to execute instructions and process information stored in, for example, a memory 1205. The processor 1203 can include one or more processing cores with each core configured to perform independently. A multi-core processor enables multiprocessing within a single physical package. Examples of a multi-core processor include two, four, eight, or greater numbers of processing cores. Alternatively or in addition, the processor 1203 can include one or more microprocessors configured in tandem via the bus 1201 to enable independent execution of instructions, pipelining, and multithreading. The processor 1203 can also be accompanied with one or more specialized components to perform certain processing functions and tasks such as one or more digital signal processors (DSP) 1207, and/or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM) and static memory (e.g., ROM) for storing executable instructions that, when executed by the processor 1203 and/or the DSP 1207 and/or the ASIC 1209, perform the processes of exemplary embodiments as described herein. The memory 1205 also stores the data associated with or generated by the execution of the processes.

Exemplary methods and apparatus for demodulation of input data including a symbol recovery loop for representative sample selection and timing in demodulation of received data signals, in accordance with exemplary embodiments and aspects of the invention, have been realized both in a register transfer level (RTL) and as a model in SystemC. The Error Vector Magnitude (EVM) of the symbols generated by an exemplary parallel DFE design in SystemC, according to aspects of the invention, have been compared with the EVM obtained by a serial algorithmic implementation in a system simulator and have been observed to be substantially identical. In addition, the parallel RTL design, according to aspects of the invention, has been bit-accurately compared with the parallel SystemC design. Also, a parallel CRL design in the CSM (in which the loop runs at half the symbol-rate) has been verified to cause substantially no deterioration in performance when compared to a serial algorithmic implementation, as for example, by comparing, for verification, the results obtained in the parallel SystemC implementation and the serial system simulation.

Additionally, various aspects of the exemplary methods, apparatus and aspects of the invention described herein for processing data streams with high symbol rates for symbol timing recovery can be implemented, as for example, in a satellite terminal modem System-on-Chip (SoC), which desirably can allow the SoC to run at a clock-rate of 240 MHz and, as such, can receive substantially all the DVB-S2 frames up to a symbol-rate of 240 Msps, for example.

In contrast to the exemplary methods and apparatus according the disclosure, with current ASIC designs, the throughput of each SoC would have been approximately half, and as discussed previously, two parallel SoCs would likely be needed to maintain throughput for data streams with such high symbol rates, thus creating significant drawbacks as to increasing the cost, and the data processing is not done as a single wideband filter. And, as such, efficient and effective use of the channel or spectrum of the channel typically is degraded, particularly with respect to use of bandwidth capacity, bandwidth capacity being a commercially important consideration, as to cost considerations.

Also, for example, in comparison to a current DVB-S2 demodulator, the throughput of the symbol timing recovery loop, according to aspects of the invention, can be increased to two samples per clock. In this regard, the symbol timing recovery loop can receive data up to approximately 54 Msps using a clock of 108 MHz, whereas a symbol timing recovery loop, according to exemplary embodiments, can receive data up to approximately 240 Msps using a clock of 240 MHz.

In the preceding specification, various embodiments have been described with reference to the accompanying drawings. It will, however, be evident that various modifications and changes can be made thereto, and additional embodiments can be implemented, without departing from the broader scope of the invention as set forth in the claims that follow. The specification and drawings are accordingly to be regarded in an illustrative rather than restrictive sense.

What is claimed is:

1. A method comprising:
receiving a data stream of a data transmission, the data stream corresponding to a plurality of data symbols;
generating a plurality of intermediate data samples corresponding to each of the data symbols;
generating one or more representative data samples, corresponding to each of the data symbols, based at least in part on timing control signals and the intermediate data samples for the respective data symbol;
dropping certain of the representative data samples corresponding to each of the data symbols based on drop control signals;
generating error correction signals by determining phase errors corresponding to timing errors in processing the data samples, and filtering the phase errors; and
adjusting the timing control signals and the drop control signals based at least in part on the error correction signals.

2. A method according to claim 1, wherein the representative data samples comprise one or more of a fractional data sample and an integer data sample, and the timing control signals comprise one or more of a fractional time and an integer time.

3. A method according to claim 1, wherein the data stream is processed in a parallelized manner.

4. A method according to claim 1, wherein the data transmission comprises one of a continuous mode or a burst mode data transmission in a communications system, wherein the communications system comprises one or more of a satellite communications system and a computer network communications system.

5. A method according to claim 1, further comprising demodulating the data stream, wherein the demodulation of the data stream comprises:
formatting the data samples into a parallelized format; and
generating the intermediate data samples at a sampling rate of at least approximately twice the symbol rate of the received data stream; and
wherein the generation of the representative data samples corresponding to each of the data symbols is performed based at least in part on a symbol timing recovery using a clock rate of a slower rate than the symbol rate of the data stream.

6. A method according to claim 5, wherein the representative data samples comprise one or more of a fractional data sample and an integer data sample, and the timing control signals comprise one or more of a fractional time and an integer time.

7. An apparatus comprising:
at least one processor; and
at least one memory including computer program code for one or more programs,
the at least one memory and the computer program code configured to, with the at least one processor, cause the apparatus to perform at least the following,
receive a data stream of a data transmission, the data stream corresponding to a plurality of data symbols;

generate a plurality of intermediate data samples corresponding to each of the data symbols;

generate one or more representative data samples, corresponding to each of the data symbols, based at least in part on timing control signals and the intermediate data samples for the respective data symbol;

drop certain of the representative data samples corresponding to each of the data symbols based on drop control signals;

generate error correction signals by determining phase errors corresponding to timing errors in processing the data samples, and filtering the phase errors; and adjust the timing control signals and the drop control signals based at least in part on the error correction signals.

8. An apparatus according to claim 7, wherein the data stream is processed in a parallelized manner.

9. An apparatus according to claim 7, wherein the data transmission comprises one of a continuous mode or a burst mode data transmission in a communications system, wherein the communications system comprises one or more of a satellite communications system and a computer network communications system.

10. An apparatus according to claim 7, wherein the apparatus is further caused to demodulate the data stream, wherein the demodulation of the data stream comprises:

formatting the data samples into a parallelized format; and processing the data samples at a sampling rate of at least approximately twice the symbol rate of the received data stream; and wherein the generation of the representative data samples corresponding to each of the data symbols is performed based at least in part on a symbol timing recovery using a clock rate of a slower rate than the symbol rate of the data stream.

11. An apparatus comprising:

a receiver module configured to receive a data stream of a data transmission, the data stream corresponding to a plurality of data symbols;

a sampler module configured to generate a plurality of intermediate data samples corresponding to each of the data symbols;

a control module configured to generate timing control signals and drop control signals;

an interpolator module configured to generate one or more representative data samples, corresponding to each of the data symbols, based at least in part on the timing control signals and the intermediate data samples for the respective data symbol;

a sample dropper module configured to drop certain of the representative data samples corresponding to each of the data symbols based on the drop control signals;

a filter configured to filter the representative data samples to provide one or more filtered data samples corresponding to each of the respective data symbols;

a phase detector configured to determine phase information regarding the filtered data samples; and a loop filter configured to filter the phase information, and to generate filtered phase information signals, wherein the timing control signals and the drop control signals generated by the control module are based at least in part on the filtered phase information signals; and wherein the control module is further configured to adjust the timing control signals and the drop control signals based on the filtered phase signals.

12. An apparatus according to claim 11, wherein the control module comprises:

an oscillator configured to generate the timing control signals and the drop control signals, wherein the drop control signals are generated based at least in part on a ratio between an incoming symbol rate and an outgoing sample rate for the data stream.

13. An apparatus according to claim 12, wherein the representative data samples comprise one or more of a fractional data sample and an integer data sample, and the timing control signals comprise one or more of a fractional time and an integer time.

14. An apparatus according to claim 12, wherein the data transmission comprises one of a continuous mode or a burst mode data transmission in a communications system, wherein the communications system comprises one or more of a satellite communications system and a computer network communications system.

15. An apparatus according to claim 12, wherein the oscillator comprises a numerically controlled oscillator (NCO), the interpolator module comprises one or more Lagrange interpolators;

the sample dropper module comprises one or more shift registers configured to provide the determined optimal representative data samples as output data samples for further processing, the filter comprises a finite impulse response (FIR) matched filter, and the loop filter runs at a rate of (symbol rate/N), where the "symbol rate" corresponds to the symbol rate for the received data stream and "N" corresponds to a number of the data symbols.

16. An apparatus according to claim 15, wherein the interpolator module determines the representative data samples corresponding to each of the data symbols through an interpolation operation based at least in part on two or more of the data samples for the respective data symbol and the timing control signals.

17. An apparatus according to claim 11, wherein the interpolator module determines the representative data samples corresponding to each of the data symbols through an interpolation operation based at least in part on two or more of the data samples for the respective data symbol and the timing control signals.

18. An apparatus according to claim 11, wherein the receiver module is further configured to format the received data symbols into a parallelized format.

19. An apparatus according to claim 18, wherein the data stream is processed at a sampling rate of at least approximately twice the symbol rate of the data stream, and generation of the representative data samples is performed based at least in part on a symbol timing recovery using a clock rate of a slower rate than the symbol rate of the data stream.

* * * * *